(12) United States Patent
Wassell et al.

(10) Patent No.: US 8,240,401 B2
(45) Date of Patent: *Aug. 14, 2012

(54) SYSTEM AND METHOD FOR DAMPING VIBRATION IN A DRILL STRING

(75) Inventors: Mark Ellsworth Wassell, Kingswood, TX (US); William Evans Turner, Durham, CT (US); Daniel E. Burgess, Middletown, CT (US); Carl Allison Perry, Middletown, CT (US)

(73) Assignee: APS Technology, Inc., Wallingford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/206,445

(22) Filed: Aug. 9, 2011

(65) Prior Publication Data

US 2011/0291334 A1    Dec. 1, 2011

Related U.S. Application Data

(63) Continuation of application No. 12/109,328, filed on Apr. 24, 2008, now Pat. No. 7,997,357, which is a continuation of application No. 11/737,400, filed on Apr. 19, 2007, now Pat. No. 7,377,339, which is a continuation of application No. 10/983,486, filed on Nov. 8, 2004, now Pat. No. 7,219,752.

(60) Provisional application No. 60/518,116, filed on Nov. 7, 2003.

(51) Int. Cl.
*E21B 28/00*    (2006.01)

(52) U.S. Cl. ........................ 175/322; 267/125

(58) Field of Classification Search .......... 175/320–322; 267/125

See application file for complete search history.

(56) References Cited

U.S. PATENT DOCUMENTS

| | | | |
|---|---|---|---|
| 3,345,832 A | 10/1967 | Bottoms | |
| 3,539,025 A | 11/1970 | Downen | |
| 3,834,471 A | 9/1974 | Bottoms | |
| 3,871,193 A | 3/1975 | Young | |
| 3,898,815 A | 8/1975 | Young | |
| 3,947,008 A | 3/1976 | Mullins | |

(Continued)

FOREIGN PATENT DOCUMENTS

WO    2005/047640 A2    5/2005

OTHER PUBLICATIONS

Chen, S.L., "Field Investigation of the Effects of Stick-Slip, Lateral and Whirl Vibrations on Roller Cone Bit Performance," SPE 56439, presented at the 58th SPE ATCE, Houston, Oct. 3-6, 1991.

(Continued)

*Primary Examiner* — Daniel P Stephenson
(74) *Attorney, Agent, or Firm* — Woodcock Washburn LLP

(57) ABSTRACT

A system for damping vibration in a drill string can include a valve assembly having a supply of a fluid, a first member, and a second member capable of moving in relation to first member in response to vibration of the drill bit. The first and second members define a first and a second chamber for holding the fluid. Fluid can flow between the first and second chambers in response to the movement of the second member in relation to the first member. The valve assembly can also include a coil or a valve for varying a resistance of the fluid to flow between the first and second chambers.

10 Claims, 16 Drawing Sheets

U.S. PATENT DOCUMENTS

| | | | |
|---|---|---|---|
| 4,133,516 A | 1/1979 | Jurgens |
| 4,281,726 A | 8/1981 | Garrett |
| 4,427,079 A | 1/1984 | Walter |
| 4,647,853 A | 3/1987 | Cobern |
| 4,761,889 A | 8/1988 | Cobern et al. |
| 4,779,852 A | 10/1988 | Wassell |
| 4,813,274 A | 3/1989 | DiPersio et al. |
| 4,894,923 A | 1/1990 | Cobern et al. |
| 5,034,929 A | 7/1991 | Cobern et al. |
| 5,133,419 A | 7/1992 | Barrington |
| 5,251,708 A | 10/1993 | Perry et al. |
| 5,382,373 A | 1/1995 | Carlson et al. |
| 5,816,344 A | 10/1998 | Turner |
| 5,833,541 A | 11/1998 | Turner et al. |
| 5,927,409 A | 7/1999 | Turner |
| 5,931,000 A | 8/1999 | Turner et al. |
| 6,102,681 A | 8/2000 | Turner |
| 6,105,690 A | 8/2000 | Biglin, Jr. et al. |
| RE36,848 E | 9/2000 | Bui et al. |
| 6,123,561 A | 9/2000 | Turner et al. |
| 6,134,892 A | 10/2000 | Turner et al. |
| 6,257,356 B1 | 7/2001 | Wassell |
| 6,378,558 B1 | 4/2002 | Pohl et al. |
| 6,568,470 B2 | 5/2003 | Goodson, Jr. et al. |
| 6,808,455 B1 | 10/2004 | Solorenko et al. |
| 7,021,406 B2 | 4/2006 | Zitha |
| 7,032,670 B2 | 4/2006 | Zitha |
| 7,036,612 B1 | 5/2006 | Raymond et al. |
| 7,219,752 B2 | 5/2007 | Wassell et al. |
| 7,287,604 B2 | 10/2007 | Aronstam |
| 7,377,339 B2 | 5/2008 | Wassell et al. |
| 7,578,360 B2 | 8/2009 | Haughom |
| 7,997,357 B2 * | 8/2011 | Wassell et al. ............... 175/322 |
| 2005/0056463 A1 | 3/2005 | Aronstam et al. |

OTHER PUBLICATIONS

Dykstra, M.W., "Experimental Evaluations of Drill Bit and Drill String Dynamics," SPE 28323, presented at the 61st SPE ATCE, New Orleans, Sep. 25-28, 1994.

Spencer Jr., B.F., "Phenomenological Model of a Magnetorheological Damper," Journal of Engineering Mechanics, ASCE, 123 230-238, 1997.

Turner, W.E., "New Isolator for Controlling BHA Vibrations," Energy Week Conference, Houston, Jan. 27, 1997.

Warren, T.M., "Shock Sub Performance Tests," IADC/SPE 39323, presented at the 1998 IADC/SPE Drilling Conference, Dallas, Mar. 3-6, 1998.

Harvey, P., "The Design of Steerable Systems to Minimize the Adverse Effects of Motor Imbalance and Drillstring Forces," SPE 22565, presented at the 66th SPE ATCE, Dallas, Oct. 6-9, 1999.

Magnetic Ride Control, GM Tech Links, 4:1, pp. 1-2, Jan. 2002.

* cited by examiner

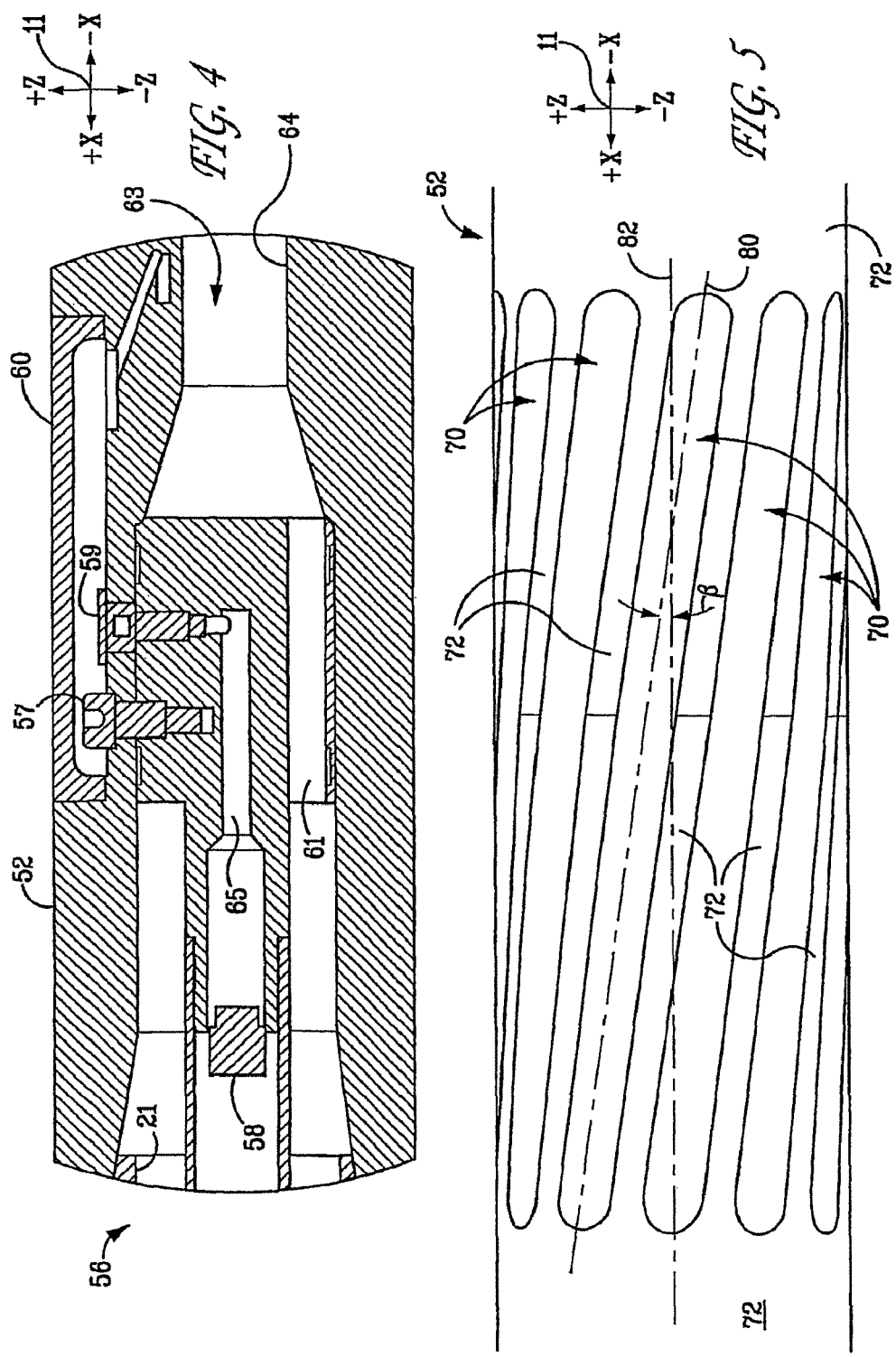

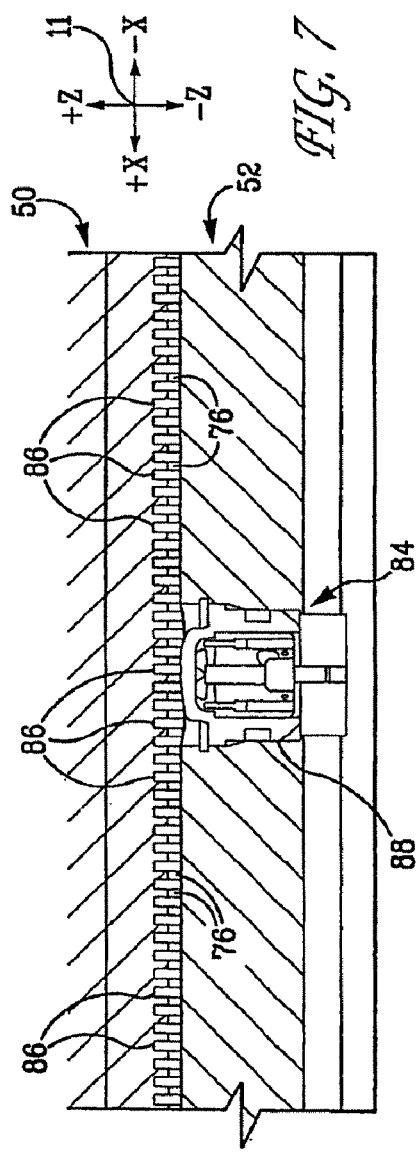
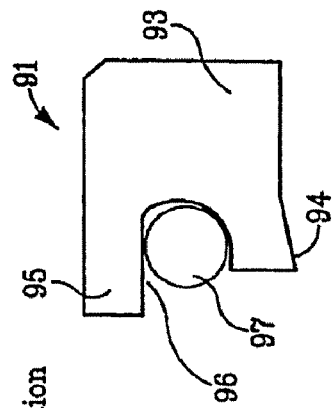
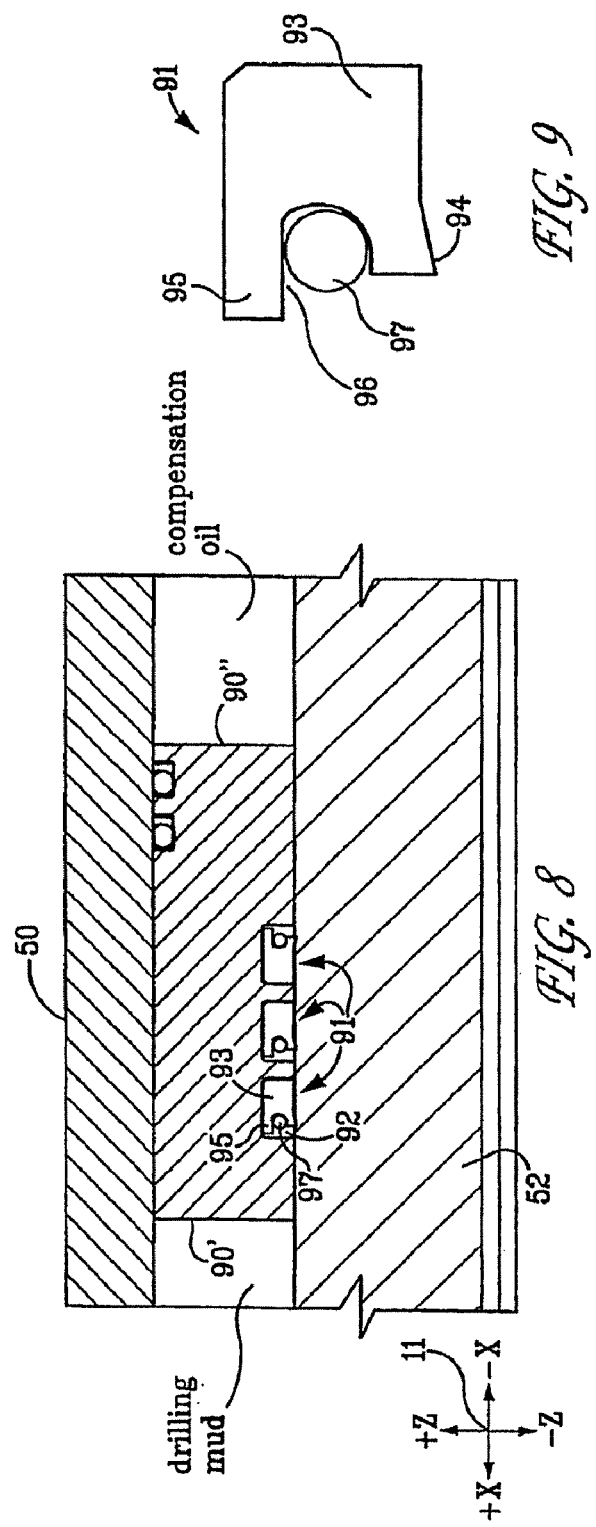

Soft Spring
$k_1 := 210000 \text{ lb/in}$ $n_1 := 28$ $h_1 := 0.328 \text{ in}$ $h_{1w} := 0.036 \text{ in}$ $k_{1c} := k_1/n_1$ $k_{1c} := 7500 \text{ lb/in}$ $L_1 := n_1 \cdot h_1$ $L_1 := 9.184 \text{ in}$ $\Delta L_1 := n_1 \cdot h_{1w}$ $\Delta L_1 := 1.008 \text{ in}$

*FIG. 15A*

Hard Spring
$k_2 := 1160000 \text{ lb/in}$ $n_2 := 58$ $h_2 := 0.602 \text{ in}$ $h_{2w} := 0.0517 \text{ in}$ $k_{2c} := k_2/n_2$ $k_{2c} := 20000 \text{ lb/in}$ $L_2 := n_2 \cdot h_2$ $L_2 := 34.916 \text{ in}$ $\Delta L_2 := n_2 \cdot h_{2w}$ $\Delta L_2 := 2.999 \text{ in}$ Combined Spring $L_c := L_1 + L_2$ $L_c := 44.1 \text{ in}$ $\delta := 0.0 \text{ in}, 0.01 \text{ in}, .4 \text{ in}$ $k_c(\delta) := \begin{vmatrix} \dfrac{1}{\dfrac{1}{k_{1c}} + \dfrac{1}{k_{2c}}} & \text{if} \quad \delta \leq \Delta L \\ k_{2c} \text{ otherwise} \end{vmatrix}$ $\dfrac{1}{\dfrac{1}{k_{1c}} + \dfrac{1}{k_{2c}}} = 5455 \text{ lb/in}$

*FIG. 15B*

SYSTEM AND METHOD FOR DAMPING VIBRATION IN A DRILL STRING

CROSS REFERENCE TO RELATED APPLICATION

This application is a continuation of U.S. application Ser. No. 12/109,328, filed Apr. 24, 2008 now U.S. Pat. No. 7,997,357, now allowed, which is a continuation of U.S. patent application Ser. No. 11/737,400 filed Apr. 19, 2007, now U.S. Pat. No. 7,377,339, which is a continuation of U.S. application Ser. No. 10/983,486, filed Nov. 8, 2004, U.S. Pat. No. 7,219,752, which claims priority under 35 U.S.C. §119(e) to U.S. provisional application No. 60/518,116, filed Nov. 7, 2003, the contents of which is incorporated by reference herein in its entirety.

Pursuant to 35 U.S.C. §202(c), it is acknowledged that the U.S. government may have certain rights to the invention described herein, which was made in part with funds from the Deep Trek program of the U.S. Department of Energy National Energy Technology Laboratory, Grant Number DE-FC26-02NT41664.

FIELD OF THE INVENTION

The present invention relates to underground drilling, and more specifically to a system and a method for damping vibration that occurs in a drill string during drilling operations.

BACKGROUND OF THE INVENTION

Underground drilling, such as gas, oil, or geothermal drilling, generally involves drilling a bore through a formation deep in the earth. Such bores are formed by connecting a drill bit to long sections of pipe, referred to as a "drill pipe," so as to form an assembly commonly referred to as a "drill string." The drill string extends from the surface to the bottom of the bore.

The drill bit is rotated so that the drill bit advances into the earth, thereby forming the bore. In rotary drilling, the drill bit is rotated by rotating the drill string at the surface. Piston-operated pumps on the surface pump high-pressure fluid, referred to as "drilling mud," through an internal passage in the drill string and out through the drill bit. The drilling mud lubricates the drill bit, and flushes cuttings from the path of the drill bit. The drilling mud then flows to the surface through an annular passage formed between the drill string and the surface of the bore.

The drilling environment, and especially hard rock drilling, can induce substantial vibration and shock into the drill string. Vibration also can be introduced by factors such as rotation of the drill bit, the motors used to rotate the drill string, pumping drilling mud, imbalance in the drill string, etc. Such vibration can result in premature failure of the various components of the drill string. Substantial vibration also can reduce the rate of penetration of the drill bit into the drilling surface, and in extreme cases can cause a loss of contact between the drill bit and the drilling surface.

Operators usually attempt to control drill string vibration by varying one or both of the following: the rotational speed of the drill string, and the down-hole force on the drill bit (commonly referred to as "weight-on-bit"). These actions often do not effectively reduce the vibrations. Reducing the weight-on-bit or the rotary speed of the drill bit usually reduces drilling efficiency. In particular, drill bits typically are designed for a predetermined rotary speed range and weight-on-bit. Operating the drill bit off of its design point can reduce the performance and the service life of the drill bit.

So-called "shock subs" are sometimes used to dampen drill string vibrations. Shock subs, however, typically are optimized for one particular set of drilling conditions. Operating the shock sub outside of these conditions can render the shock sub ineffective, and in some cases can actually increase drill string vibrations. Moreover, shock subs and isolators usually isolate the portions of the drill string up-hole of the shock sub or isolator from vibration, but can increase vibration in the down-hole portion of the drill string, including the drill bit.

An ongoing need therefore exists for a system and method that can dampen drill-string vibrations, and particularly vibration of the drill bit, throughout a range of operating conditions.

SUMMARY OF THE INVENTION

A preferred embodiment of a valve assembly for damping vibration of a drill bit comprises a first member capable of being mechanically coupled to the drill bit so that the first member is subjected to vibration from the drill bit, and a supply of magnetorheological fluid.

The valve assembly also comprises a second member mechanically coupled to the first member so that the second member can translate in relation to the first member along a longitudinal centerline of the valve assembly, the first and second members defining a first and a second chamber for holding the magnetorheological fluid. The first and second chambers are in fluid communication.

The valve assembly further comprises a coil proximate to one the first and the second members so that the magnetorheological fluid can be subjected to a magnetic field generated by the coil.

A preferred embodiment of a valve assembly for damping vibration of a drill bit in a drill string comprises a supply of a fluid, a first member capable of being coupled to the drill string so that the first member is subjected to vibration from the drill bit, and a second member capable of moving in relation to first member in response to the vibration of the drill bit.

The first and second members define a first and a second chamber for holding the fluid. The first and second chambers are in fluid communication so that the fluid flows between the first and second chambers in response to the movement of the second member in relation to the first member. The valve assembly also comprises means for varying a resistance of the fluid to flow between the first and second chambers.

A preferred embodiment of a torsional bearing assembly for transmitting torque to a drill bit comprises a first member capable of being mechanically coupled to a source of the torque so that the first member rotates in response to the torque. The first member has a first groove formed therein.

The torsional bearing assembly also comprises a second member capable of being mechanically coupled to the drill bit so that the drill bit rotates in response to rotation of the second member. The second member is mechanically coupled to the first member so that the second member can translate in relation to the first member in a first direction substantially coincident with a longitudinal centerline of the torsional bearing assembly. The second member has a second groove formed therein that faces the first groove so that the first and second grooves form a passage extending substantially in a second direction.

The torsional bearing assembly also comprises a ball bearing disposed in the passage for transmitting the torque between the first and the second members.

A preferred embodiment of a spring assembly for use in a drill string comprises a first member capable of being mechanically coupled to the drill bit so that the first member can translate in a first and an opposing second direction in response to the movement of the drill bit.

The spring assembly also comprises a second member mechanically coupled to the first member so that the first member can translate in relation to the second member in the first and the second directions, and a spring stack disposed on one of the first and the second members.

A first end of the spring stack is substantially restrained and a second end of the spring translates in the first direction when the first member translates in the first direction in relation to the second member so that the spring stack is compressed. A second end of the spring stack is substantially restrained and the first end of the spring stack translates in the second direction when the first member translates in the second direction in relation to the second member so that the spring stack is compressed.

A preferred embodiment of a vibration damping system for use in a drill string for drilling a drill hole comprises a bearing comprising a first member and a second member coupled to the first member so that the first member can translate in an up-hole and a down-hole direction in relation to the second member and torque can be transferred between the first and the second members.

The vibration damping system also comprises a valve assembly comprising a first member securely coupled to the first member of the torsional bearing assembly so that the first member of the valve assembly translates in the up-hole and down-hole directions with the first member of the torsional bearing assembly.

The valve assembly also comprises a second member securely coupled to the second member of the torsional bearing assembly so that the second member of the valve assembly translates in the up-hole and down-hole directions with the second member of the first torsional bearing assembly, the first and second members of the valve assembly defining a first and a second chamber for holding a supply of a fluid so that the fluid flows between the first and the second chambers in response to relative movement between the first and second members of the valve assembly. The valve assembly further comprises means for varying a flow resistance of the fluid.

The vibration damping system further comprises a spring assembly comprising a first member securely coupled to the first member of the valve assembly so that the first member of the spring assembly translates in the up-hole and down-hole directions with the first member of the valve assembly.

The spring assembly also comprises a second member securely coupled to the second member of the valve assembly the so that the second member of the spring assembly translates in the up-hole and down-hole directions with the second member of the valve assembly. The spring assembly further comprises a spring for resisting relative movement between the first and second members of the spring assembly.

A preferred method for damping vibration of a drill bit comprises providing a valve assembly capable of exerting a viscous damping force on the drill bit, and controlling the viscous damping force in response to at least one operating parameter of the drill bit.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings:

FIG. 4 is a magnified view of the area designated "A" in FIG. 1;

FIG. 5 is a side view of a mandrel of the torsional bearing assembly shown in FIG. 3;

FIG. 7 is a magnified view of the area designated "C" in FIG. 3;

FIG. 8 is a magnified view of the area designated "D" in FIG. 3;

FIG. 9 is a side view of a reciprocating seal of the torsional bearing assembly shown in FIG. 3;

FIGS. 15A and 15B list equations for calculating a combined spring constant of a first and a second spring of the spring assembly shown in FIG. 14;

DESCRIPTION OF PREFERRED EMBODIMENTS

Figure 1:
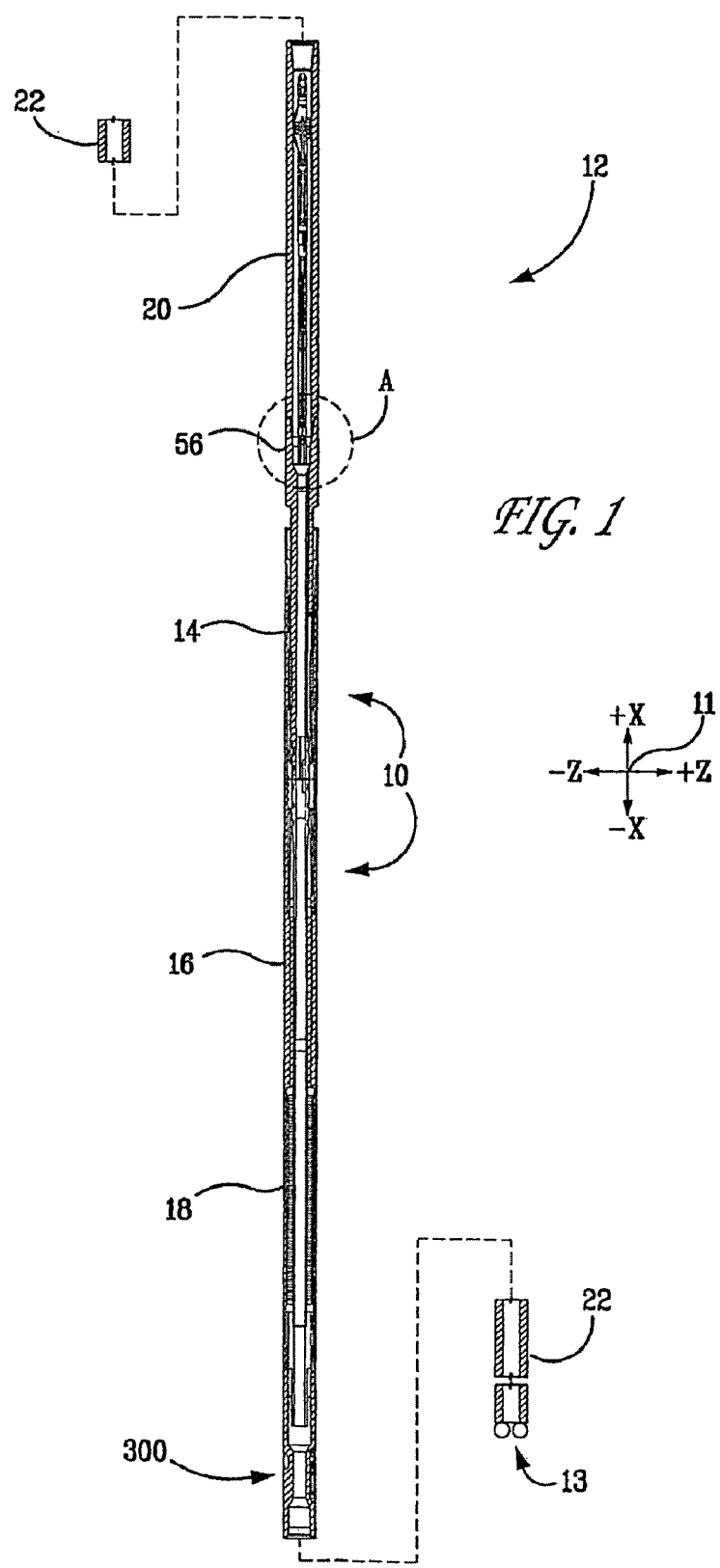
FIG. 1 is a longitudinal cross-sectional view of a preferred embodiment of a vibration damping system installed as part of a drill string.

The figures depict a preferred embodiment of a vibration damping system 10. The figures are each referenced to a common coordinate system 11 depicted therein. The vibration damping system 10 can be used as part of a drill string 12, to dampen vibration of a drill bit 13 located at a down-hole end of the drill string 12 (see FIG. 1).

The vibration damping system 10 comprises a torsional bearing assembly 14, a valve assembly 16, and a spring assembly 18. The valve assembly 16 and the spring assembly 18 can produce axial forces that dampen vibration of the drill bit 13. The magnitude of the damping force can be varied by the valve assembly 14 in response to the magnitude and frequency of the vibration, on a substantially instantaneous basis. The vibration damping assembly 10 can be mechanically coupled to the drill bit by drill pipe 22 that forms part of the drill string 12.

The torsional bearing assembly 14 can facilitate the transmission of drilling torque, while permitting relative axial movement between the portions of the drill string 12 located up-hole and down-hole of the vibration damping system 10. Moreover, the torsional bearing assembly 14 can transform torsional vibration of the drill bit 13 into axial vibration. The axial vibration, in turn, can be damped by the valve assembly 16 and the spring assembly 18.

Figure 2:
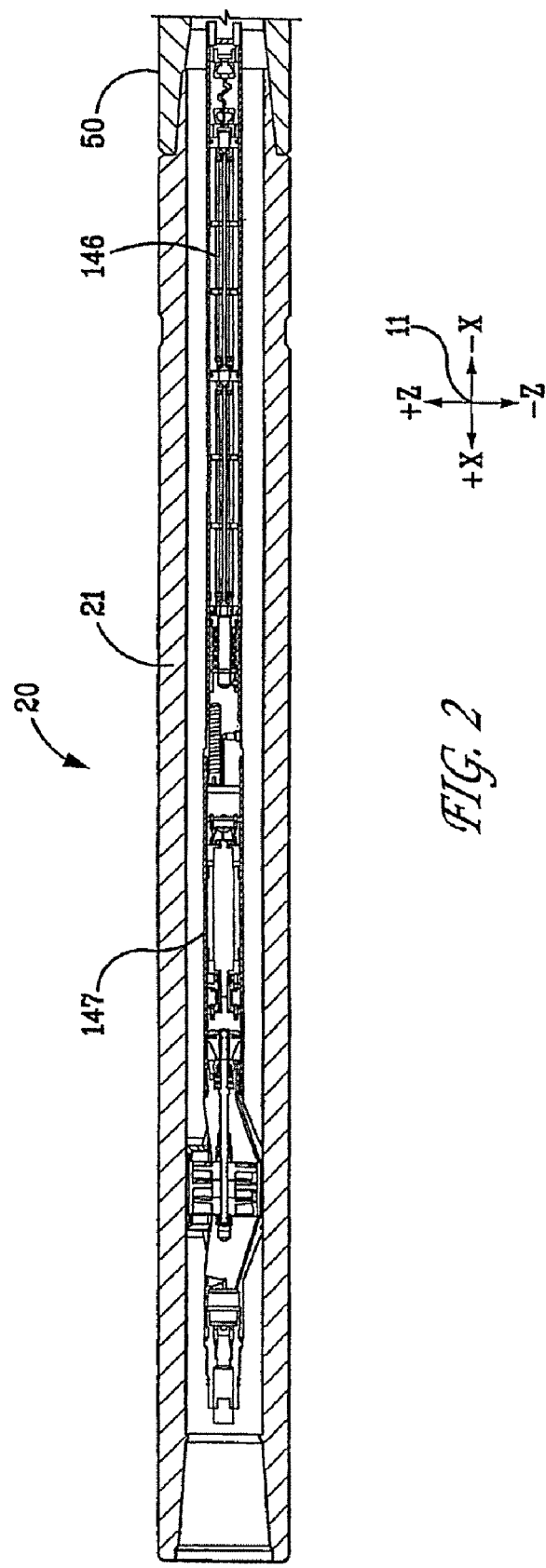
FIG. 2 is a longitudinal cross-sectional view of a turbine alternator assembly of the drill string shown in FIG. 1.

The vibration damping system 10 can be mechanically and electrically connected to a turbine-alternator module 20 located up-hole of the vibration damping system 10 (see FIGS. 1 and 2). (The up-hole and down-hole directions correspond respectively to the "+x" and "−x" directions denoted in the figures.) The turbine-alternator module 20 can provide electric power for the vibration damping system 10. The use of the vibration damping system 10 in conjunction with the turbine-alternator module 20 is described for exemplary purposes only. The vibration damping system 10 can be powered by an alternative means such as a battery located in the vibration damping system 10 (or elsewhere in the drill string 12), or a power source located above ground.

Figure 3:
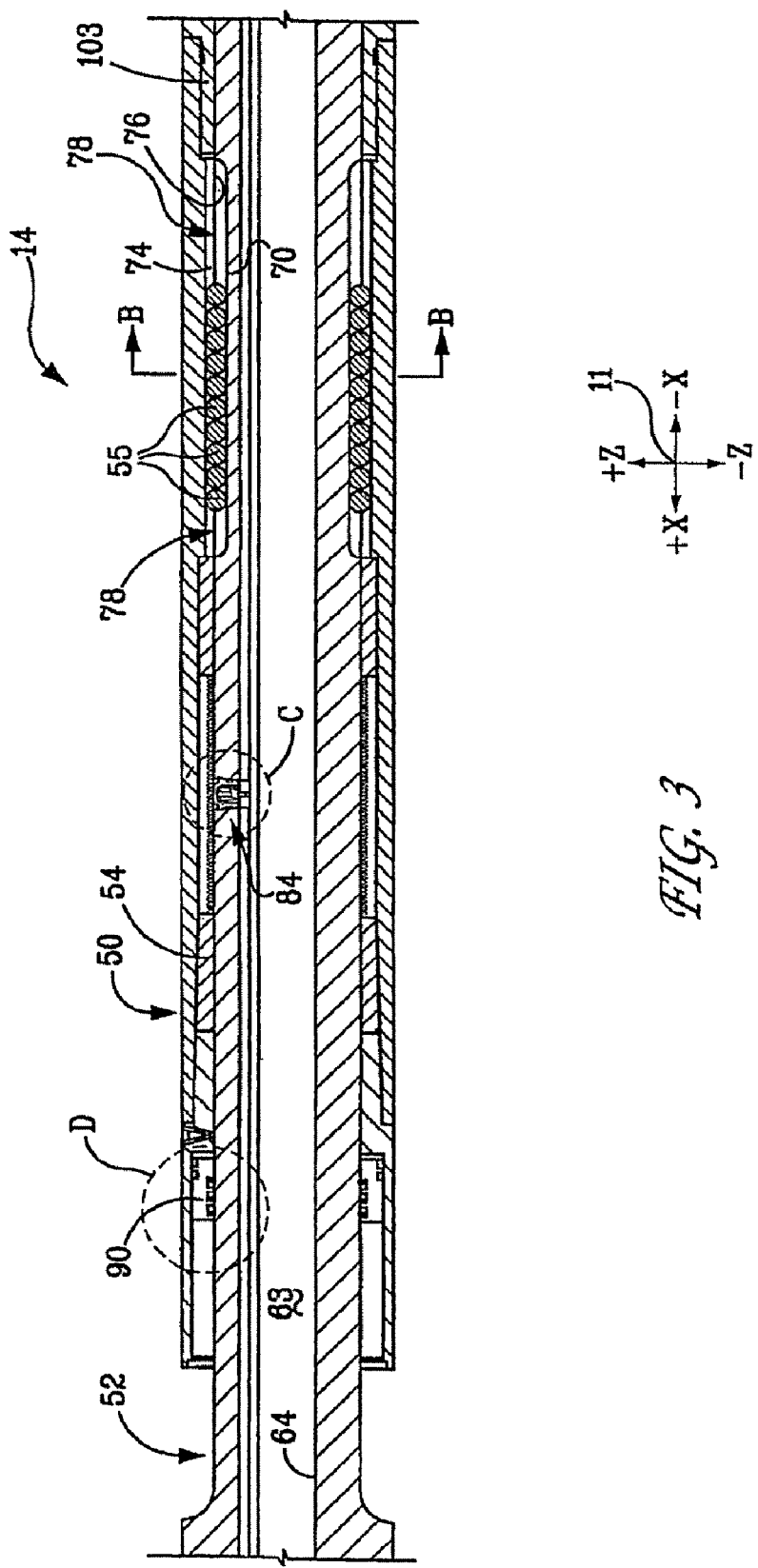
FIG. 3 is a longitudinal cross-sectional view of a torsional bearing assembly of the vibration damping system shown in FIG. 1.
Figure 6:
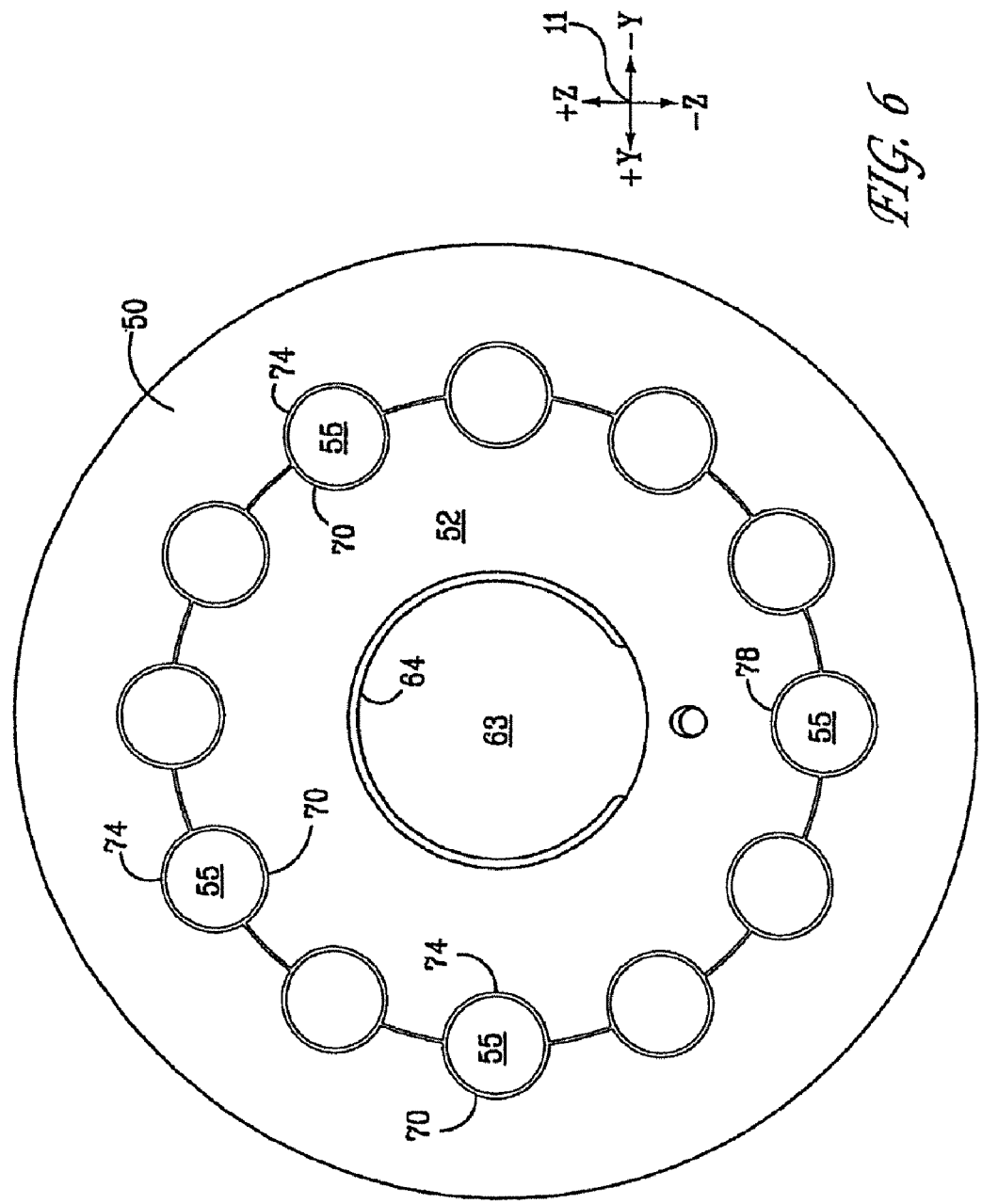
FIG. 6 is a cross-sectional view taken through the line "B-B" of FIG. 3.

The torsional bearing assembly 14 comprises a casing 50 and a bearing mandrel 52 (see FIGS. 3, 5, and 6). The bearing casing 50 and the bearing mandrel 52 are disposed in a substantially coaxial arrangement, with the bearing mandrel 52 located within the bearing casing 50. The bearing mandrel 52 is supported within the bearing casing 50 by a radial bearing 54. The bearing casing 50 can translate axially in relation to the bearing mandrel 52. The torsional bearing assembly 12 also comprises a plurality of ball bearings 55 for transmitting torque between the bearing mandrel 52 and the bearing casing 50. The ball bearings 55 can be, for example, rock bit balls (other types of ball bearings can be used in the alternative).

Drilling torque is transmitted to an outer casing 21 of the turbine-alternator module 20 by way of a drill pipe 22 located up-hole of the turbine-alternator module 20 (see FIG. 1). The bearing mandrel 52 is secured to the outer casing 21 so that the drilling torque is transferred to the bearing mandrel 52. The bearing mandrel 52 therefore rotates, and translates axially with the outer casing 21.

A centralizer feed-thru 56 is positioned within the bearing mandrel 52, proximate the up-hole end thereof, and is secured to the bearing mandrel 52 by a locking pin 57 (see FIGS. 1 and 4). The centralizer feed-thru 56 can be supported by one or more ribs (not shown).

The centralizer feed-thru 56 facilitates routing of electrical signals and power between the turbine-alternator assembly 20 and the torsional bearing assembly 12. In particular, the centralizer feed-thru 56 includes a multi-pin connector 58 for electrically connecting the centralizer feed-thru 56 to the turbine-alternator assembly 20. The centralizer feed-thru 56 also includes a second electrical connector 59. Wiring (not shown) is routed from the connector 58 to the connector 59 by way of a passage 60 formed within the centralizer feed-thru 56. (Additional wiring (also not shown) is routed from the electrical connector 59 and through a wireway formed in the bearing mandrel 52.) The centralizer feed-thru 56 also includes a removable panel 60 for providing access to the locking pin 57 and the connector 59.

The centralizer feed-thru 56 has a passage 61 formed therein. The passage 61 adjoins a passage 63 defined in the bearing mandrel 52 by an inner surface 64 thereof. The passage 63 receives drilling mud from the passage 61.

The bearing mandrel 52 has a plurality of grooves 70 formed in an outer surface 72 thereof (see FIG. 5). The grooves 70 are substantially parallel, and are spaced apart in substantially equal angular increments along the outer surface 72. (The grooves 70 can be spaced apart in unequal angular increments in alternative embodiments.) The surfaces of the bearing mandrel 52 that define the grooves 70 each have substantially semi-circular shape, to accept the substantially spherical ball bearings 55.

The depth of each groove 70 is substantially constant along the length thereof. Preferably, the grooves 70 are substantially straight. In other words, a longitudinal centerline 80 of each groove 70 is shaped substantially as a helix.

The bearing casing 50 has a plurality of grooves 74 formed on an inner surface 76 thereof (see FIGS. 3, 5, and 6). The size, shape, and orientation of the grooves 74 are approximately equal those of the grooves 70.

Each groove 74 faces a corresponding one of the grooves 70 when the bearing casing 50 and the bearing mandrel 52 are assembled. Each corresponding groove 70 and groove 74 define a passage 78 for ten of the ball bearings 55 (see FIG. 3). Each passage 78 preferably has a length greater than a combined length of the ten ball bearings 55 disposed therein, to facilitate translation of the ball bearings 50 along the passage 78. (The number of ball bearings 55 within each groove 70 is application dependent, and can vary with factors such as the amount of torque to be transferred between the bearing casing 50 and the bearing mandrel 52; more or less than ten of the ball bearings 55 can be disposed in each groove 70 in alternative embodiments.)

The grooves 70 and the grooves 74 are sized so that sufficient clearance exists between the walls of the grooves 70, 74 and the associated ball bearings 55 to permit the ball bearings 55 to translate in the lengthwise direction within the passages 78.

Each groove 70 preferably is angled in relation to a longitudinal centerline 82 of the bearing mandrel 52 (see FIG. 5). (Axially-aligned grooves can be used in the alternative, for reasons discussed below.) (The longitudinal centerline 82 of the bearing mandrel 52 is oriented substantially in the axial ("x") direction). In particular, a centerline 80 of each groove 70 is oriented in relation to the centerline 82 at a helix angle denoted by the reference symbol "β" in FIG. 5. Preferably, the helix angle β lies within a range of approximately four degrees to approximately fifteen degrees.

The optimal value for the helix angle β is application dependent; a particular value is presented for exemplary purposes only. In particular, the optimal value for β can be calculated based on the following parameters: maximum torque (T) and maximum allowable axial force ($F_A$) to be transmitted through the drill string 12; radial distance (R) between the centerline 82 of the bearing mandrel 52 and the centers of the ball bearings 55; and maximum tangential force ($F_C$) on the ball bearings 55 (equal to T/R). The helix angle $\beta = \arcsin(F_A/F_C)$.

Drilling torque transmitted to the bearing mandrel 52 from the turbine-alternator assembly 20 exerts a tangential force, i.e., a force coincident with the "y-z" plane, on the ball bearings 55. The tangential force is transferred to the ball bearings 55 by way of the walls of the grooves 70. The ball bearings 55 transfer the torque to the bearing casing 50 by way of the walls of the grooves 74, thereby causing the bearing casing 50 to rotate with the bearing mandrel 52.

Movement of the ball bearings 55 along the length of their respective passage 80 can facilitate relative movement between the bearing mandrel 52 and the bearing casing 50 in the axial direction. Hence, the torsional bearing assembly 14 substantially decouples the portion of the drill string 12 down-hole of the vibration damping system 10 from axial movement of the portion of the drill string 12 up-hole of the vibration damping system 10, and vice versa.

The use of the ball bearings 55 is believed to minimize friction, and the sticking associated therewith, as the bearing mandrel 52 translates axially in relation to the bearing casing 50. Alternative embodiments can be configured with other means for facilitating relative axial movement between the bearing mandrel 52 and the bearing casing 50.

The bearing mandrel 52 and the bearing casing 50 are restrained from relative tangential movement, i.e., movement in the "y-z" plane, due to the substantially straight geometry of the passages 78, and because the ball bearings 55 remain at a substantially constant distance from the centerline 82 of the bearing mandrel 52 as the ball bearings 57 translate along their associated passages 78.

The bearing casing 50 is connected to the drill bit 13 by way of the valve assembly 16, the spring assembly 18, and the portion of the drill string 12 located down-hole thereof. The bearing casing 50 therefore rotates with the drill bit 13, and translates with the drill bit 13 in the axial direction. Hence, axial and torsional vibrations of the drill bit 13 are transmitted up-hole by way of the drill string 12, to the bearing casing 50.

Orienting the passages 78 at the helix angle β, it is believed, can transform at least a portion of the torsional vibration acting on the bearing casing 50 into axial vibration. In particular, the angled orientation of the passages 78 permits the bearing casing 50 to rotate (by a minimal amount) in relation to the bearing mandrel 52 in response to torsional vibration. The rotation of the bearing casing 50 is converted into an axial force due to the angled orientation of the passages 78. Hence, the torsional vibration acting on the bearing casing 50 can be converted, at least in part, into axial vibration acting on the bearing mandrel 52. This axial vibration, as discussed below, can be transferred to and damped by the valve assembly 16 and the spring assembly 18. (In addition, the angled orientation of the passages 78 is believed to generate friction damping that further reduces the torsional vibration.)

It should be noted that the grooves 70, 74 in alternative embodiments can be formed so that the passages 70 extend in a direction substantially parallel to the longitudinal centerline 82 of the bearing mandrel 52. (Torsional vibration of the drill bit 13 will not be converted into axial vibration in the above-described manner, in these types of embodiments.)

The torsional bearing assembly 14 also comprises a linear variable displacement transducer (LVDT) 84 for measuring the relative displacement of the bearing casing 50 and the bearing mandrel 52 in the axial direction (see FIGS. 3 and 7). The LVDT 84 comprises an array of axially-spaced magnetic elements 86 embedded in the bearing casing 50, proximate the inner surface 76 thereof. The LVDT 84 also comprises a sensor 88, such as a Hall-effect sensor, mounted on the bearing mandrel 52 so that the sensor 88 is magnetically coupled to the magnetic elements 86.

The sensor 88 produces an electrical output as a function of the position of the sensor 88 in relation to the array of magnetic elements 86. The LVDT 84 thereby can provide an indication of the relative axial positions of the bearing casing 50 and the bearing mandrel 52. Moreover, the rate of change of the output is a function of the rate of change in the relative positions of the sensor 88 and the array of magnetic elements 86. Hence, the LVDT 84 can provide an indication of the relative axial displacement, velocity, and acceleration of the bearing casing 50 and the bearing mandrel 52.

The torsional bearing assembly 14 also includes a compensation piston 90 (see FIGS. 3 and 8). As shown best in FIG. 8, the compensation piston 90 is positioned between the bearing mandrel 52 and the bearing casing 50, proximate an up-hole end of the bearing casing 50. An up-hole side 90' of the compensation piston 90 is exposed to drilling mud. A down-hole side 90" of the compensation piston 90 is exposed to compensation oil used to equalize the pressurize within the interior of the vibration damping system 10.

The compensation piston 90 can slide in the axial direction in relation to the bearing casing 50 and the bearing mandrel 52, in response to a pressure differential between the drilling mud and the compensation oil. This feature can to help to equalize the pressure between the compensation oil and the drilling mud, and compensate for thermal expansion of the compensation oil. In particular, the movement of the compensation piston 90 can help to pressurize the compensation oil as the distance of the drill bit 13 below ground level increases (thereby causing an increase in the pressure of the drilling mud).

Three reciprocating seals 91 are positioned in grooves 92 formed around the outer circumference of the compensation piston 90 (see FIGS. 3, 8, and 9). The seals 91 substantially isolate the compensation oil from the drilling mud. Two of the seals 91 preferably face the drilling mud, so as to discourage infiltration of the drilling mud into the compensation oil.

Each seal 91 includes a heel 93, a lip (scraper) 94, and an extension 95. The lip 94 adjoins the heel 93, and forms part of the inner diameter of the seal 91. The extension 95 adjoins the heel 93, and forms part of the outer diameter of the seal 91. The heel 93, lip 94, and extension 95 preferably are formed from a wear and extrusion-resistant material, such as a blend of polytetrafluoroethylene (PTFE) and carbon-graphite.

The heel 93, lip 94, and extension 95 define a groove 96. A spring 97 is disposed in the groove 96. The spring 97 preferably is a ribbon spring. Preferably, the spring 97 is formed from a resilient, corrosion-resistant material such as Elgiloy. The spring 97 exerts a force on the lip 94 in the radially-outward direction. The force urges the lip 94 into contact with the adjacent surface of the bearing mandrel 52, and can help to maintain this contact as the lip 94 wears.

The groove 96 preferably is sized so that the surface area of the seal 91 that defines the groove 96 is minimal. This feature can help to minimize the pressure forces exerted on the lip 94 by the drilling mud or the compensation oil.

The geometry of the lip 94, it is believed, causes the lip 94 to scrape (rather than slide over) the drilling mud or the compensation oil on the adjacent surface of the bearing mandrel 52 as the compensation piston 90 translates in relation thereto (the seals 91 therefore are believed to be particularly well suited for use with an abrasive materials such as drilling mud or magnetorheological fluid).

The extension 95 helps to maintain spacing between the lip 94, and the gap between the bearing mandrel 52 and the compensation piston 90. This feature therefore can reduce the potential for the lip 94 to become trapped in the gap and damaged during movement of the compensation piston 90.

The heel 93 preferably is sized so that the height of the seal 91 exceeds the height of the corresponding groove 92. The seals 91 therefore can act as glide rings that support the compensation piston 90 on the bearing mandrel 52.

The relatively large size of the heel 93 is believed to help the heel 93 resist the potentially large differential pressures that can form across the seal 91.

Figure 10:
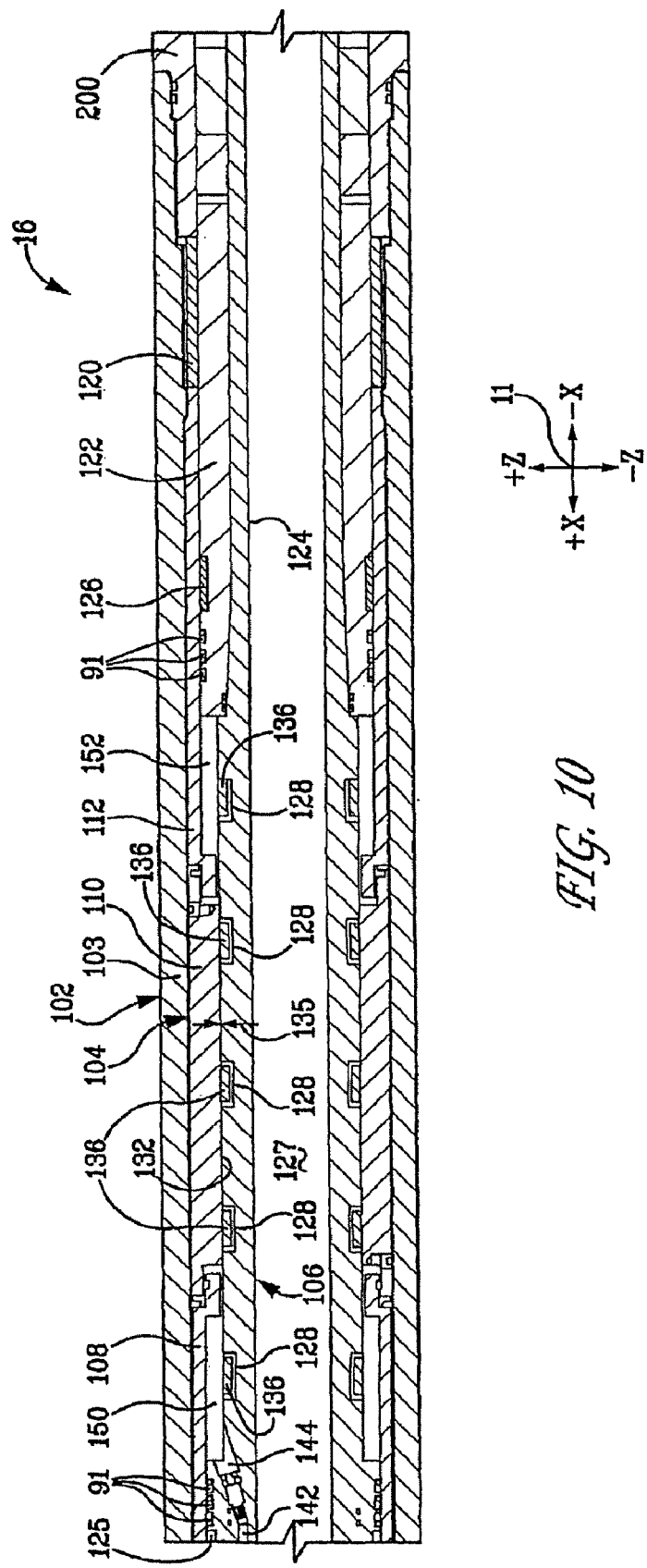
FIG. 10 is a longitudinal cross-sectional view of a valve assembly of the vibration damping system shown in FIG. 1.

The valve assembly 16 is located immediately down-hole of the torsional bearing assembly 12 (see FIGS. 1 and 10). The valve assembly 16 comprises a valve casing 102. The valve casing 102 comprises an outer casing 103, and a housing 104 positioned within the outer casing 103.

Figure 11:
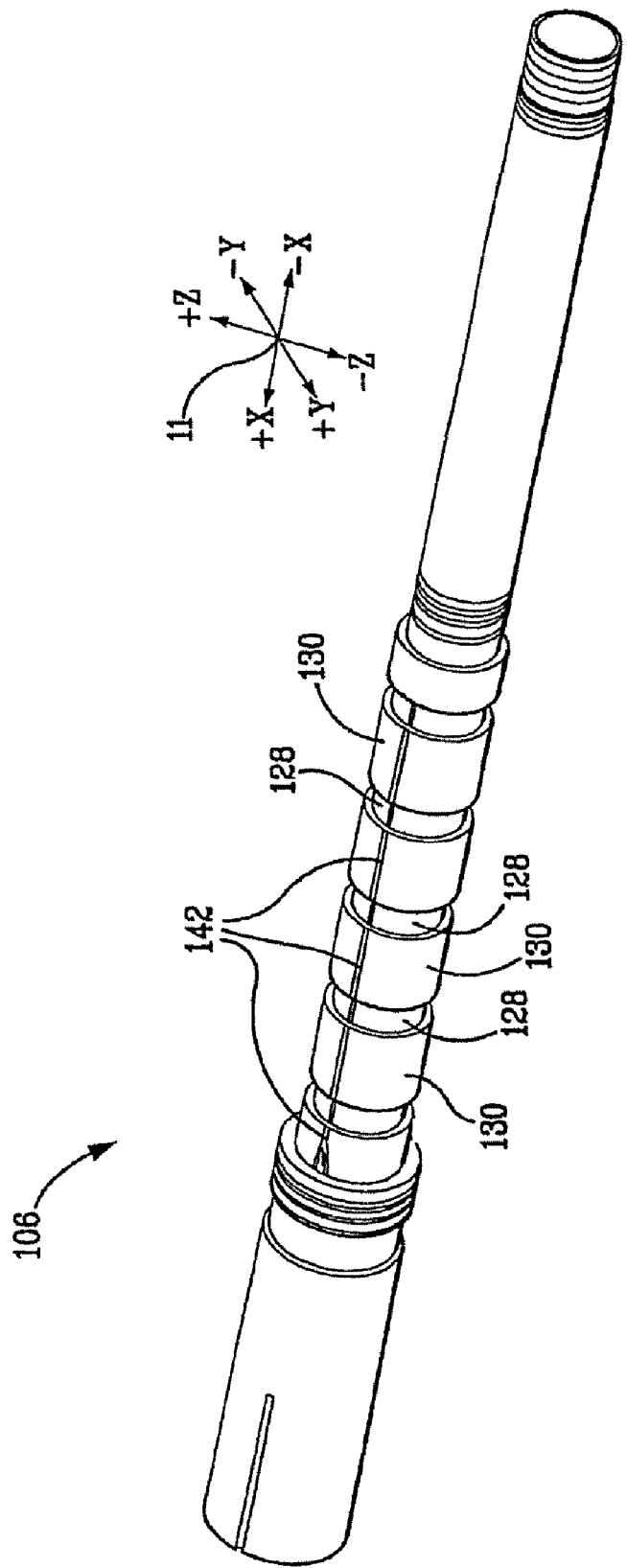
FIG. 11 is a perspective view of a mandrel of the valve assembly shown in FIG. 10.

The valve assembly 16 also comprises a coil mandrel 106 positioned within the valve casing 102 (see FIGS. 10 and 11). The outer casing 103, housing 104, and coil mandrel 106 are disposed in a substantially coaxial arrangement. The coil mandrel 106 preferably is formed from a material having a high magnetic permeability and a low magnetic susceptibility, such as 410 stainless steel.

The coil mandrel 106 is secured to the bearing mandrel 52 so that the coil mandrel 106 rotates, and translates axially with the bearing mandrel 52.

As shown in FIG. 3, the outer portion 103 of the valve casing 102 is secured to the bearing casing 50 so that the drilling torque is transferred from the bearing casing 50 to the valve casing 102. The valve casing 102 therefore rotates, and translates axially with the bearing casing 50.

The housing 104 preferably comprises a first portion 108, and a second portion 110 located down-hole of the first portion 108 (see FIG. 10). The housing 104 also comprises a third portion 112 located down-hole of the second portion 110. (It should be noted that the housing 104 can be formed as one piece in alternative embodiments. Moreover, the housing 104 and the outer casing 103 can be formed as one piece in alternative embodiments.)

The up-hole end of the first portion 108 abuts a lip (not shown) on the outer casing 103 of the valve casing 102. The down-hole end of the third portion 112 abuts a radial bearing 120 of the valve assembly 16 (see FIG. 10). This arrangement restrains the housing 104 from axial ("x" direction) movement in relation to the outer casing 103. (The housing 104 therefore translates axially with the outer casing 103.)

The valve assembly 16 also comprises a sleeve 122 (see FIG. 10). The sleeve 122 is concentrically disposed around portion of the coil mandrel 106, proximate the down-hole end thereof. The sleeve 122 is secured to the coil mandrel 106 so that the sleeve 122 rotates, and translates axially with the coil mandrel 106.

A first linear bearing 125 is positioned in a groove formed around the coil mandrel 106, proximate the up-hole end thereof. A second linear bearing 126 is positioned in a groove formed around the sleeve 122. The first and second linear bearings 125, 126 help to support the coil mandrel 106 and the sleeve 122, and facilitate axial movement of the coil mandrel 106 and the sleeve 122 in relation to the housing 104 (and the valve casing 102).

An inner surface 124 of the coil mandrel 106 defines a passage 127 for permitting drilling mud to flow through the valve assembly 16. The passage 127 adjoins the passage 63 formed in the bearing mandrel 52.

The coil mandrel 106 has a plurality of outwardly-facing recesses 128 formed around a circumference thereof (see FIGS. 10 and 11). Adjacent ones of the recesses 128 are separated by outer surface portions 130 of the coil mandrel 106.

The coil mandrel 106 and the second portion 110 of the housing 104 are sized so that a clearance, or gap 135 exists between an inner surface 132 of the second portion 110, and the adjacent outer surface portions 130 of the coil mandrel 106 (see FIG. 10). The gap 135 preferably is within the range of approximately 0.030 inch to approximately 0.125 inch. (The optimal value, or range of values for the gap 135 is application-dependent; a specific range of values is presented for exemplary purposes only.)

The valve assembly 16 also comprises a plurality of coils 136. Each of the coils 136 is wound within a respective one of the recesses 128. Adjacent ones of the coils 136 preferably are wound in opposite directions (the purpose of this feature is discussed below).

A groove 140 is formed in each of the outer surface portions 130 to facilitate routing of the wiring for the coils 136 between adjacent ones of the recesses 128 (see FIG. 11). The grooves 140 each extend substantially in the axial ("x") direction. A wireway 142 and an electrical feed thru 144 are formed in the coil mandrel 106 to facilitate routing of the wire 138 from the up-hole end of the coil mandrel 106 to the recesses 128 (see FIG. 10). (The coils 136 can be positioned on the valve casing 102 instead of (or in addition to) the coil mandrel 106 in alternative embodiments.)

Figure 19:
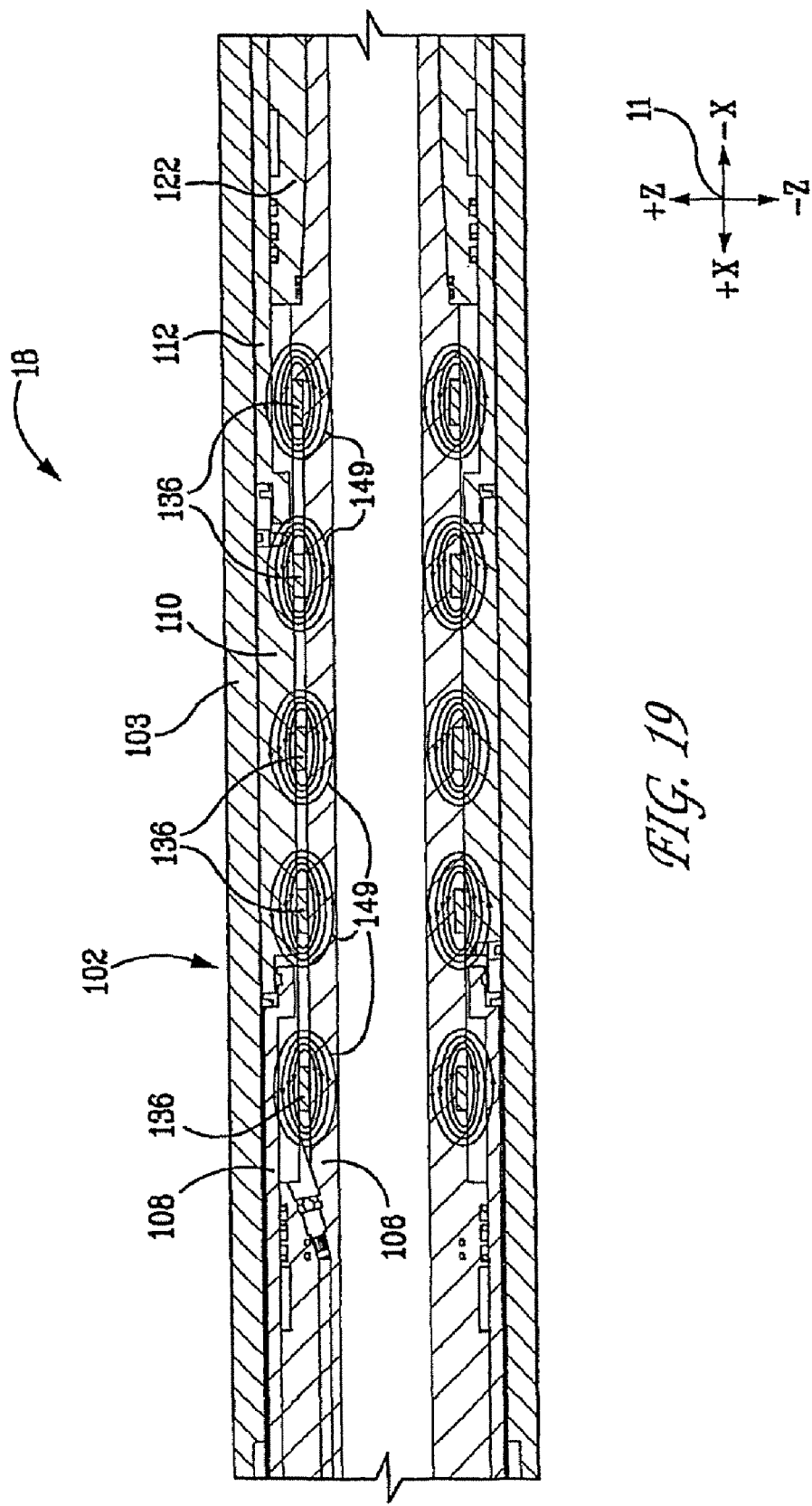
FIG. 19 is a cross-sectional side view of the valve assembly shown in FIG. 10, showing lines of magnetic flux generated by coils of the valve assembly.

The coils 136 each generate a magnetic field 149 in response to the passage of electrical current therethrough (the magnetic fields 149 are depicted diagrammatically in FIG. 19). The coils 136 can be electrically connected to a controller 146 mounted in the turbine-alternator assembly 20 (see FIG. 2). The controller 146 can be powered by an alternator 147 of the turbine-alternator assembly 20. The controller 146 can supply an electrical current to the coils 136. The controller 146 can control the magnitude of the electrical current to vary the strength of the aggregate magnetic field generated by the coils 136. Further details relating to this feature are presented below.

The controller 146 is depicted as being mounted within the turbine-alternator assembly 20 for exemplary purposes only. The controller 146 can be mounted in other locations, including above-ground locations, in the alternative.

The first portion 108 of the housing 104 and the coil mandrel 106 define a circumferentially-extending first, or up-hole, chamber 150 (see FIG. 10). The third portion 112 of the housing 104 and the coil mandrel 106 define a circumferentially-extending second, or down-hole chamber 152.

The first and second chambers 150, 152 are filled with a magnetorheological fluid (hereinafter referred to as "MRF"). MRFs typically comprise non-colloidal suspensions of ferromagnetic or paramagnetic particles. The particles typically have a diameter greater than approximately 0.1 microns. The particles are suspended in a carrier fluid, such as mineral oil, water, or silicon.

Under normal conditions, MRFs have the flow characteristics of a conventional oil. In the presence of a magnetic field (such as the magnetic fields 149), however, the particles suspended in the carrier fluid become polarized. This polarization cause the particles to become organized in chains within the carrier fluid.

The particle chains increase the fluid shear strength (and therefore, the flow resistance or viscosity) of the MRF. Upon removal of the magnetic field, the particles return to an unorganized state, and the fluid shear strength and flow resistance returns to its previous value. Thus, the controlled application of a magnetic field allows the fluid shear strength and flow resistance of an MRF to be altered very rapidly. MRFs are described in U.S. Pat. No. 5,382,373 (Carlson et al.), which is incorporated by reference herein in its entirety. An MRF suitable for use in the valve assembly 16 is available from APS Technology of Cromwell, Conn.

The first chamber 150 and the second chamber 152 are in fluid communication by way of the gap 135 formed between the inner surface 132 of the second portion 110, and the adjacent outer surface portions 130 of the coil mandrel 106. Hence, the MRF can move between the first and second chambers 150, 152 by way of the gap 135.

The MRF in the first chamber 150 is substantially isolated from the compensation oil located up-hole thereof by three of the reciprocating seals 91 (as described above in relation to the compensation piston 90) disposed in grooves formed in the coil mandrel 106. The MRF in the second chamber 152 is substantially isolated from the compensation oil located down-hole thereof by three more of the seals 91 disposed in additional grooves formed in the sleeve 122. Two of the seals 91 in each set of three face the MRF in the associated chamber 150, 152, to discourage infiltration of the MRF into the chamber 150, 152.

The outer portion 103 of the valve casing 102 is connected to the drill bit 13 by way of the spring assembly 18 and the portion of the drill pipe 22 located down hole of the vibration damping system 10. The outer portion 103 therefore rotates, and translates axially with the drill bit 13. Moreover, the coil mandrel 106 and the sleeve 122 are substantially decoupled from axial movement of the valve casing 102 by the torsional bearing assembly 14.

The above-noted arrangement causes the coil mandrel 106 and the sleeve 122 to reciprocate within the housing 104 in response to vibration of the drill bit 13. This movement alternately decreases and increases the respective volumes of the first and second chambers 150, 152. In particular, movement of the coil mandrel 106 and the sleeve 122 in the up-hole direction in relation of the housing 104 increases the volume of the first chamber 152, and decreases the volume of the second chamber 150. Conversely, movement of the coil mandrel 106 and the sleeve 122 in the down-hole direction in relation of the housing 104 decreases the volume of the first chamber 152, and increases the volume of the second chamber 150. The reciprocating movement of the coil mandrel 106 and the sleeve 122 within the housing 104 thus tends to pump the MRF between the first and second chambers 150, 152 by way of the gap 135.

The flow resistance of the MRF causes the valve assembly 16 to act as a viscous damper. In particular, the flow resistance of the MRF causes the MRF to generate a force (opposite the direction of the displacement of the coil mandrel 106 and the sleeve 122 in relation to the housing 104) that opposes the flow of the MRF between the first and second chambers 150, 152. The MRF thereby resists the reciprocating motion of the coil mandrel 106 and the sleeve 122 in relation to the housing 104. This resistance can dampen axial vibration of the drill bit 13.

The magnitude of the damping force generated by the MRF is proportional a function of the flow resistance of the MRF and the frequency of the axial vibration. The flow resistance of the MRF, as noted above, can be increased by subjecting the MRF to a magnetic field. Moreover, the flow resistance can be varied on a substantially instantaneous basis by varying the magnitude of the magnetic field.

The coils 136 are positioned so that the lines of magnetic flux generated by the coils 136 cut through the MRF located in the first and second chambers 150, 152 and the gap 135 (see FIG. 19). The current through the coils 136, and thus the magnitude of the magnetic flux, is controlled by the controller 146. The use of multiple axially-spaced coils 136 is believed to distribute the magnetic fields 149 axially within the MRF, helping to ensure that the MRF is exposed to the magnetic flux regardless of the position of the coil mandrel 106 in relation to the housing 104 and the valve casing 102. Distributing the magnetic fields 149 in this manner thus can help to maximize the damping force by energizing a greater percentage of the MRF.

The controller 146 can control the current (power) through the coils 136 in response to vibration of the drill bit 13 so as to dampen vibration of the drill bit 13 (the process by which the controller performs this function is depicted in the form of a flow diagram in FIG. 130.

Figure 12:
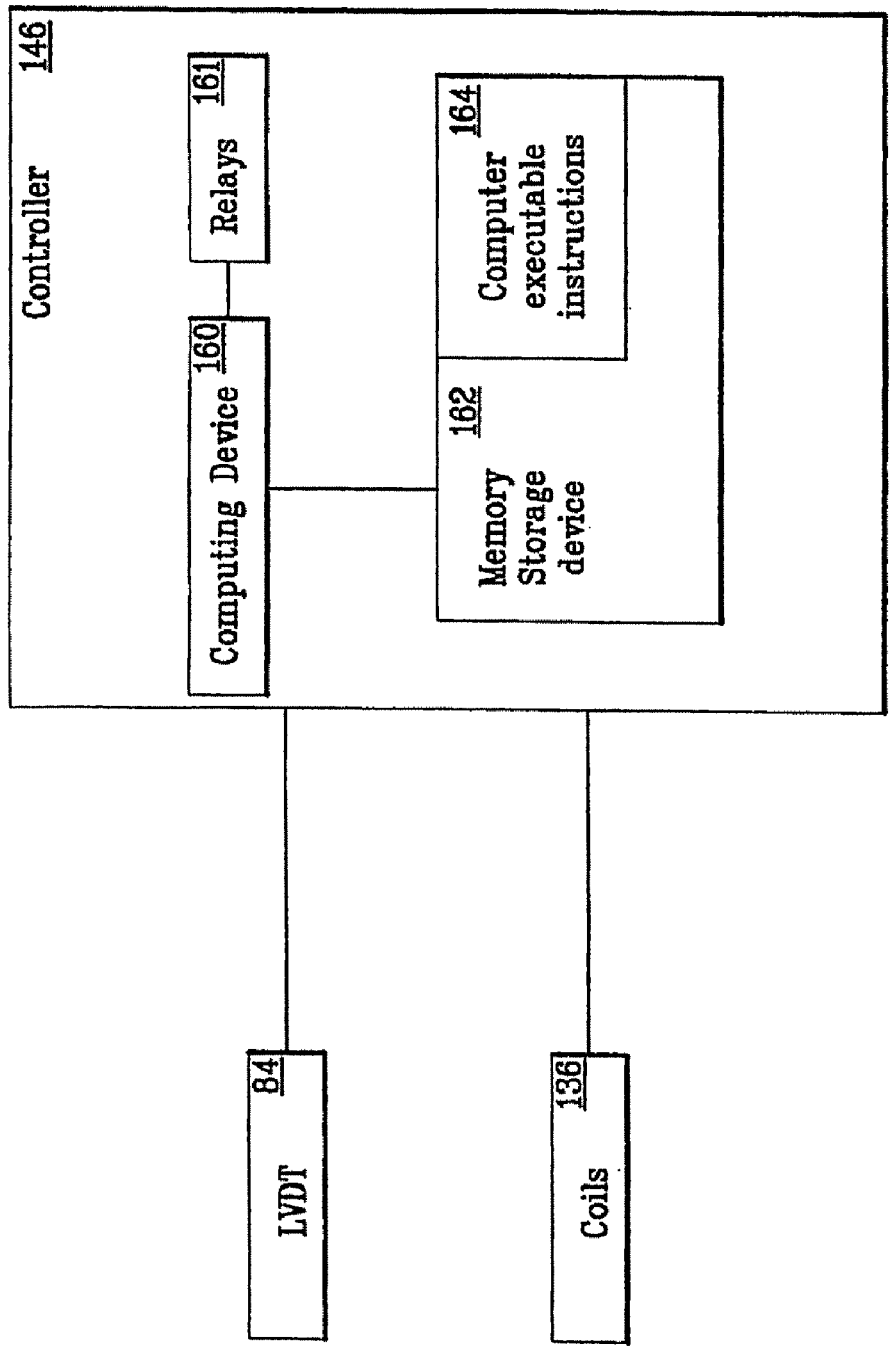
FIG. 12 is a block diagram of a controller for the valve assembly shown in FIG. 10.
Figure 13:
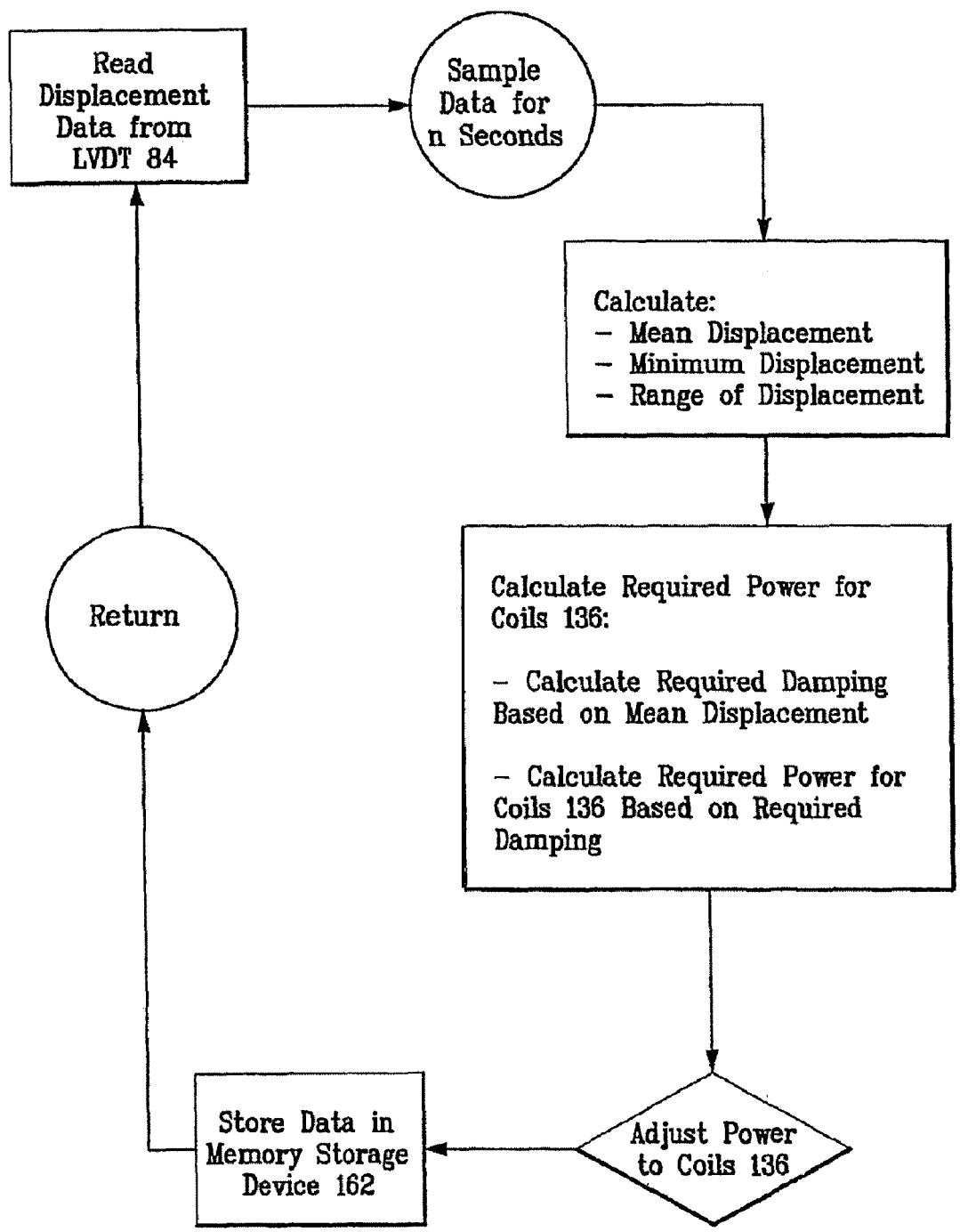
FIG. 13 is a flow diagram for depicting a process for controlling an amount of damping developed by the valve assembly shown in FIG. 10.

The controller 146 preferably comprises a computing device 160 (see FIG. 12.) The computing device 160 can be, for example, a programmable microprocessor such as a digital signal processing (DSP) chip. The controller 146 also comprises a memory storage device 162, solid state relays 162, and a set of computer-executable instructions 164. The memory storage device 162 and the solid state relays 162 are electrically coupled to the computing device 160, and the computer-executable instructions 164 are stored on the memory storage device 162.

The controller 146 is configured as a printed circuit board mounted in the turbine-alternator module 20. The controller 146 can be configured in other ways in alternative embodiments.

The LVDT 84 is electrically connected to the computing device 160. The LVDT 84 provides an input to the computing device 160 in the form of an electrical signal indicative of the relative axial position, velocity, and acceleration of the bearing casing 50 and the bearing mandrel 52, as noted above. The bearing casing 50 is connected the drill bit 12, and is substantially decoupled from axial movement of the bearing mandrel 52. Hence, the output of the LVDT 84 is responsive to the magnitude and frequency of the axial vibration of the drill bit 13.

The computer executable instructions 164 include algorithms that can determine the optimal amount of damping at a particular operating condition, based on the output of the LVDT 84, i.e., based on the displacement of the bearing mandrel 52 in relation to the bearing casing 50.

It is believed that the optimal damping level increases with the displacement of the bearing mandrel 52 in relation to the bearing casing 50. Moreover, lighter weight on bit conditions are believed to require less damping than higher weight on bit conditions. Also, the optimal amount of damping is believed to increase with the stroke of the bearing mandrel 52 in relation to the bearing casing 50.

Figure 20:
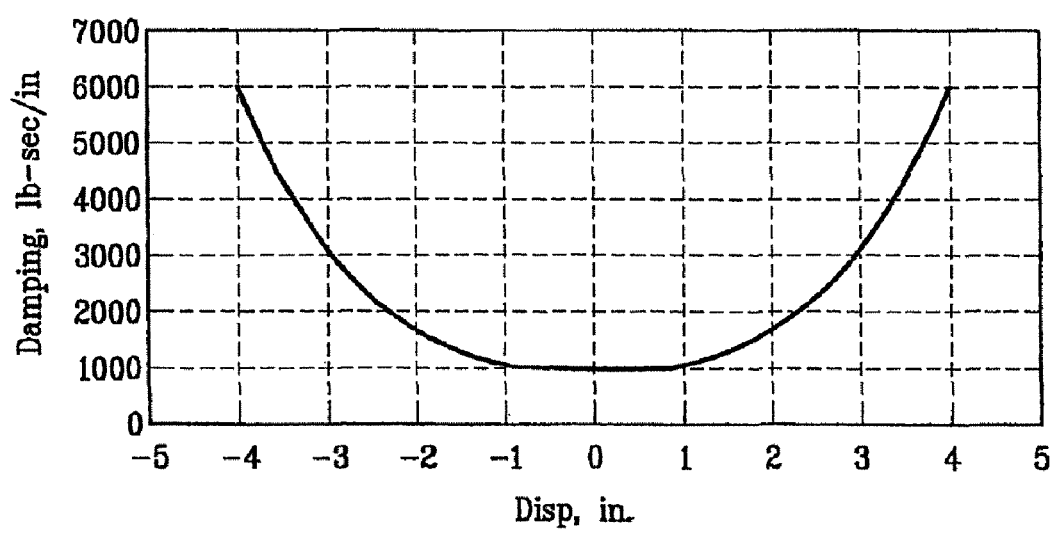
FIG. 20 depicts a curve of desired damping as a function of displacement, for the valve assembly shown in FIGS. 10 and 19.

The desired damping at a particular condition can be calculated as follows:

$$c = A \times d^n + B$$

where:
c=required damping (lb-sec/in)
d=relative displacement (as measured by the LVDT 84)
n=defines the shape of the damping curve
$A = (damping_{max} - damping_{min})/disp^n$
$Damping_{max}$=The maximum damping that occurs at the maximum displacement
$Damping_{min}$=The minimum damping that occurs at the minimum displacement or neutral point of the tool
Disp.=maximum relative displacement (4-inches, for example, for the valve assembly 14)
B=min. damping The desired damping of the valve assembly 14 is presented as a function of displacement (as measured by the LVDT 84) in FIG. 20.

The desired damping also can be defined as a quadratic equation, or as a lookup table in the controller 146.

The computer executable instructions 164 also determine the amount of electrical current that needs to be directed to the coils 136 to provide the desired damping. The controller 146 can process the input from the LVDT 84, and generate a responsive output in the form of an electrical current directed to the coils 136 on a substantially instantaneous basis. Hence, the valve assembly 16 can generate a damping force in response to vibration of the drill bit 13 on a substantially instantaneous basis.

Preferably, the damping force prevents the drill bit 13 from losing contact with the drilling surface due to axial vibration. The controller 146 preferably causes the damping force to increase as the drill bit 13 moves upward, to help maintain contact between the drill bit 13 and the drilling surface. (Ideally, the damping force should be controlled so the weight-on-bit remains substantially constant.) Moreover, it is believed that the damping is optimized when the dynamic spring rate of the vibration damping system 10 is approximately equal to the static spring rate. (More damping is required when the dynamic spring rate is greater than the static spring rate, and vice versa.)

It should be noted that alternative embodiments of the vibration damping system 10 can include sensors in addition to, or in lieu of the LVDT 84. For example, the controller 146 can be programmed to determine the requisite damping based on inputs from one or more accelerometers, weight-on-bit sensors, velocity transducers, torque-on-bit sensors, etc.

The valve assembly 16 and the controller 146 can automatically increase or decrease the amount of damping exerted on the drill bit 13 to reduce vibration of the drill bit 13. The valve assembly 16 and the controller 146 can perform this function on a substantially instantaneous basis, in response to one or more measured operating parameters. The ability to actively control vibration of the drill bit 13 in this manner, it is believed, can increase the rate of penetration of the drill bit, reduce separation of the drill bit 13 from the drilling surface, lower or substantially eliminate shock on the drill bit, and increase the service life of the drill bit 13 and other components of the drill string 12. Moreover, the valve assembly 16 and the controller 146 can provide optimal damping under variety of operating conditions, in contradistinction to shock subs. Also, the use of MRF to provide the damping force makes the valve assembly 14 more compact than otherwise would be possible.

Figure 14:
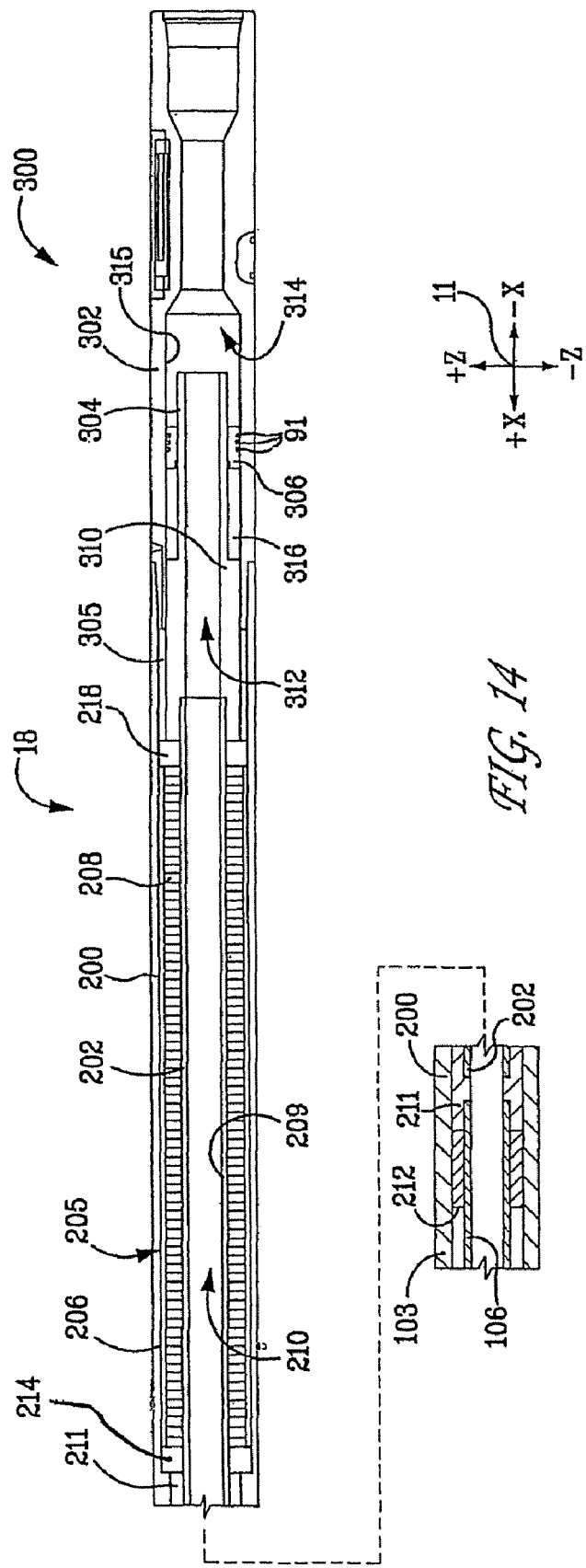
FIG. 14 is a longitudinal cross-sectional view of a spring assembly of the vibration damping system shown in FIG. 1.

The spring assembly 18 is located immediately down-hole of the valve assembly 16 (see FIGS. 1 and 14). The spring assembly 18 can exert a restoring force on the drill bit 13 in response to axial movement of the drill bit 13 (the vibration damping assembly 10 thus behaves as a spring-mass-damper system).

The spring assembly 18 comprises a spring casing 200. The up-hole end of the spring casing 200 is secured to the outer casing 103 of the valve casing 102 so that drilling torque is transferred to the spring casing 200. The down-hole end of the spring casing 200 is secured to a casing 302 of a compensation module 300, so that the drilling torque is transferred from the spring casing 200 to a casing 302 of the compensation module 300. The spring casing 200 and the casing 302 therefore rotate, and translate axially with the valve casing 102.

The spring assembly 18 also includes a spring mandrel 202, and a spring stack 205. The spring stack 205 preferably comprises a first spring 206, and a second spring 208. (The spring stack 205 can include more or less than two springs in alternative embodiments.)

The spring casing 200, the spring mandrel 202, and the spring stack 205 are disposed in a substantially coaxial relationship. The first and second springs 206, 208 are positioned in series, i.e., end to end, within the spring casing 202. The spring mandrel 202 is positioned within the first and the second springs 206, 208. (The relative axial positions of the first and second springs 206, 208 can reversed from those depicted in FIG. 14, in alternative embodiments.)

The spring mandrel 202 can translate axially in relation to the spring casing 200. An inner surface 209 of the spring mandrel 202 defines a passage 210 for permitting drilling mud to flow through the spring assembly 18.

The first and the second springs 206, 208 preferably are Belleville springs (other types of springs can be used in the alternative). Preferably, the second spring 208 is stiffer, i.e., has a higher spring rate, than the first spring 206. This feature, as discussed below, is believed to facilitate transmission of axial vibration from the drill bit 13 to the valve assembly 14 under a relatively wide range of weight-on-bit conditions. (Other spring configurations are possible in alternative embodiments. For example, one relatively soft Belleville spring can be positioned between two relatively hard Belleville springs in one possible alternative embodiment.)

The compensation module 300 also includes a mandrel 304, and a sliding compensation piston 306. The compensation piston 306 is positioned around a down-hole portion of the mandrel 304.

The mandrel 304 of the compensation module 300 extends into the down-hole portion of the spring casing 200. The mandrel 304 is supported, in part, by a radial bearing 305 positioned between the mandrel 304 and the spring casing 200. A down-hole end of the bearing 305 abuts an forward edge of the casing 302, thereby restraining the bearing 305 in the rearward direction.

An inner surface 310 of the mandrel 304 defines a passage 312 for permitting drilling mud to flow through the mandrel 304 and into the compensation module 300. The drilling mud, upon exiting the passage 312, enters a passage 314 defined by an inner surface 315 of the mandrel 304. (The drilling mud in the passage 314 acts against the down-hole side of the compensation piston 306.

The up-hole side of the compensation piston 306, the inner surface 310 of the casing 302, and the mandrel 304 define a circumferentially-extending chamber 316 within the compensation module 300. The chamber 316 is filed with compensating oil. Three of the seals 91 are positioned in grooves formed in the compensation piston 306 seal the chamber 316 to substantially isolate the compensation oil in the chamber 316 from the drilling mud in the passage 314. Two of the seals 91 preferably face the drilling mud to discourage infiltration of the drilling mud into the compensation oil.

The compensation piston 306 can slide in the axial direction in relation to the casing 302 and the mandrel 304, in response to a pressure differential between the compensation oil in the chamber 316, and the drilling mud in the passage 314. This feature can to help to equalize the pressure between the compensation oil and the drilling mud. In particular, the movement of the compensation piston 306 can help to pressurize the compensation oil as the distance of the drill bit 13 below ground level increases (thereby causing an increase in the pressure of the drilling mud).

It should be noted that details of the compensation module 300 are presented for illustrative purposes only; the vibration damping system 10 can be used in conjunction with other types of drill-string components located immediately down-hole thereof.

A coupling 211 is positioned within the spring casing 200, proximate an up-hole end thereof. The coupling 211 preferably has a substantially H-shaped cross section, as depicted in FIG. 14. The coupling 211 receives the down-hole end of the coil mandrel 106, and the up-hole end of the spring mandrel 202. The coil mandrel 106 and the spring mandrel 202 are secured to the coupling 211 so that the spring mandrel 202 rotates, and translates axially with the coil mandrel 106.

A first spacer 212 is located immediately up-hole of the coupling 211, and separates the coupling 211 from the sleeve 122 of the valve assembly 16.

A second spacer 214 is positioned between the coupling 211, and the first and spring 206. The first and the second springs 206, 208 urge the second spacer 214 into a lip 216 of the spring casing 200. Contact between the second spacer 214 and the lip 216 prevents movement of the second spacer 214 past the lip 216, and thereby restrains the first and second springs 206, 208 in the forward direction.

The rearward end of the spring mandrel 202 is positioned within the mandrel 304 of the compensation module 300. The spring mandrel 202 and the mandrel 304 can be secured by a suitable means such as an interference fit. The mandrel 304 therefore rotates, and translate axially with the spring mandrel 202.

A third spacer 218 is positioned between the second spring 208, the mandrel 304, and the bearing 305. The first and the second springs 206, 208 urge the third spacer 218 into the forward edge of the bearing 305. Contact between the third spacer 218 and the bearing 305 prevents movement of third spacer 218 in the down-hole direction, and thereby restrains the first and second springs 206, 208 in the down-hole direction.

The first and the second springs 206, 208 therefore are constrained between the second and third spacers 214, 218. This arrangement causes the first and second springs 206, 208 to function as double (dual) action springs. In particular, movement of the spring casing 200 in the down-hole direction in relation of the spring mandrel 202 causes the lip 216 of the spring casing 200 to urge the second spacer 214 in the down-hole direction. (This type of relative movement can occur during vibration-induced movement of the drill bit 13 in the down-hole direction.)

The second spacer 214, in turn, urges the first and second springs 206, 208 in the down-hole direction, against the third spacer 218. The third spacer 218, in response, acts against the mandrel 304 of the compensation assembly 300 in the down-hole direction. The mandrel 304, which is connected to the up-hole portion of the drill string 12 by way of the spring mandrel 202, coil mandrel 106, and bearing mandrel 52, reacts the force exerted thereon by the third spacer 218.

The first and second springs 206, 208 therefore become compressed in response to the movement of the spring casing 200 in the down-hole direction. The resulting spring force acts against the spring casing 200 (and the drill bit 13) in the up-hole direction, by way of the lip 216. The magnitude of the spring force is a function of the deflection of the spring casing 200 and the drill bit 13.

Movement of the spring casing 200 in the up-hole direction in relation of the spring mandrel 202 causes the forward edge of the casing 302 (which is secured to the spring casing 200) to act against the bearing 305. (This type of relative movement can occur during vibration-induced movement of the drill bit 13 in the up-hole direction.)

The bearing 305, in turn, urges the third spacer 218 and the adjacent first and second springs 206, 208 in the up-hole direction, toward the second spacer 214 and the coupling 211. The coupling 211, which is connected to the up-hole portion of the drill string 12 by way of the spring coil mandrel 106 and the bearing mandrel 52, reacts the force exerted thereon by the second spacer 214.

The first and second springs 206, 208 therefore become compressed in response to the movement of the spring casing 200 in the up-hole direction. The resulting spring force acts against the spring casing 200 (and the drill bit 13) in the down-hole direction, by way of the bearing 305 and the casing 302. The magnitude of the spring force is a function of the deflection of the spring casing 200 and the drill bit 13.

The spring assembly 218 therefore can exert a restoring force on the drill bit 13 in both the up-hole and down-hole directions. The dual-action characteristic of the first and second springs 206, 208, it is believed, makes the spring assembly 218 more compact than a comparable spring assembly that employs multiple single-action springs.

Moreover, the spring assembly 18 is adapted for use under both relatively low and relatively high weight-on-bit conditions due to the combined use of a relatively soft and a relatively hard spring. In particular, it is believed that Belleville washers of first (softer) spring 206 deflect (compress) when the weight-on-bit, i.e., the down-hole force, on the drill bit 13 is relatively low. The Belleville washers of the second spring 208 do not deflect substantially under low weight-on-bit conditions. The spring assembly 18 thus exerts a relatively low restoring force on the drill bit 13 under relatively low weight-on-bit conditions. This feature permits axial vibrations of the drill bit 13 to be transmitted to, and damped by the valve assembly 14.

Further increasing the weight-on-bit further compresses the Belleville washers of the first spring 206, until the Belleville washers of the first spring 206 become fully compressed. Additional increases in the weight-on-bit cause the Belleville washers of the second spring 208 to deflect (compress). The relatively high spring constant of the second spring 208 increases the restoring force exerted by the spring assembly 18 on the drill bit 13 as the Belleville washers of the second spring 208 begin to deflect to deflect. The spring assembly 18 thus facilitates transmission of axial vibrations to the valve assembly 16 under both relatively low and relatively high weight-on-bit conditions, while permitting axial vibration to be transmitted to and damped by the valve assembly 14 when the weight-on-bit is relatively low.

FIGS. 15A and 15B list equations for calculating the combined spring constant of the first and second springs 206, 208. Sample calculations corresponding to a "soft" spring having a spring constant of 210K pounds per inch, and a "hard" spring having a spring constant of 1,160K pounds per inch also are presented. It should be noted that these particular values for the spring constants are provided for exemplary purposes only, as the optimal spring constants for the first and second springs 206, 208 are application-dependent.

The symbols listed in FIGS. 15A and 15B represent the following parameters: k—spring constant; n—number of springs; h—free total height of the spring; $h_w$—working height of the spring; $k_c$—total spring constant; L—total spring height; $\Delta L$—maximum stroke; $L_c$—total spring stack; $\delta$—spring deflection, where the subscripts "1" and "2" denote the soft and hard springs, respectively.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

Figure 16A:
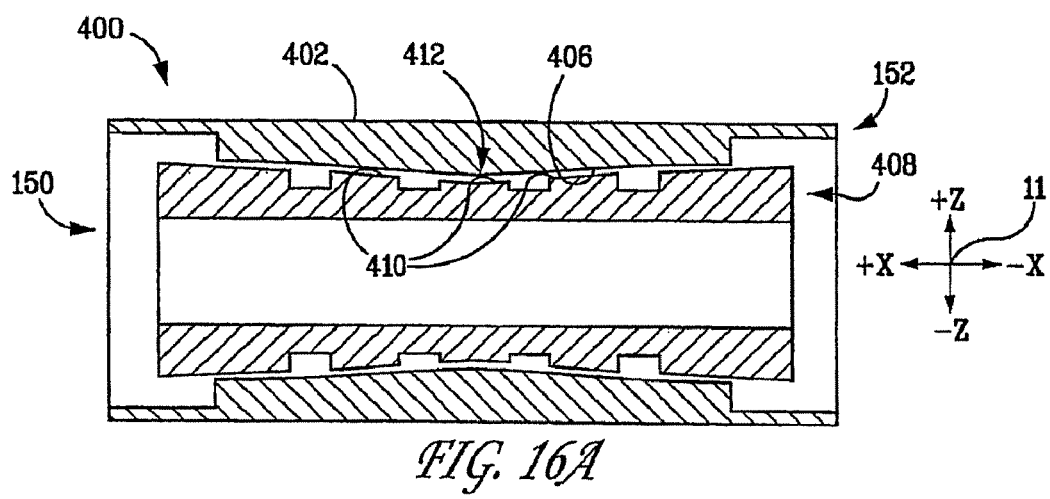
FIG. 16A is a longitudinal cross-sectional view of an alternative embodiment of the valve assembly shown in FIG. 10, depicting a mandrel of the valve assembly in a neutral position.
Figure 16B:
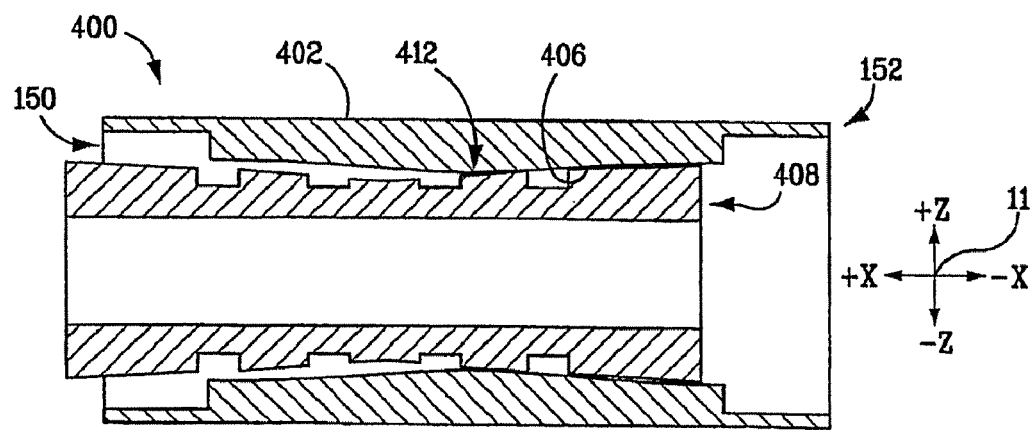
FIG. 16B is a longitudinal cross-sectional view of the valve assembly shown in FIG. 16A, depicting the mandrel in a position removed from its neutral position.

For example, FIGS. 16A and 16B depict a valve assembly 400. The valve assembly 400 is substantially identical to the valve assembly 16, with the below-noted exceptions. (Components of the valve assembly 400 that are substantially identical to those of the valve assembly 16 are denoted herein by identical reference numerals.)

The valve assembly 400 comprises a valve casing 402. The valve casing 402 has an inner surface 406. The inner surface 406 is tapered as shown in the figures. The taper of the inner surface 406 causes the inner diameter of the valve casing 402 to decrease in the axial direction, between each end of the valve casing 402 and the approximate center of thereof. In other words, the diameter of the valve casing 402 is maximal at the ends thereof, and is minimal at the approximate center thereof (in relation to the axial direction).

The valve assembly 400 also includes a coil mandrel 408 positioned within the housing, and movable in relation to the housing in the axial ("x") direction. Outer surfaces 410 of the coil mandrel 408 are tapered in a manner similar those of the inner surface 406 of the casing 402. The outer surfaces 410 of the coil mandrel 408 and the inner surface 406 of the casing 402 define a gap 412.

The taper of the inner surface 406 and the outer surface 410 causes the gap 412 to decrease in response to relative movement of the coil mandrel 408 from the centered position depicted in FIG. 16A, the position depicted in FIG. 16B. Decreasing the gap 412 increases the resistance of the MRF to movement between the up-hole and down-hole chambers 150, 152. The damping force exerted by the valve assembly 400 therefore increases with the magnitude of the vibration of the drill bit 13. The decreased gap also creates a higher electrical magnetic field within the MRF, thereby increasing the viscosity of the MRF.

Figure 17A:
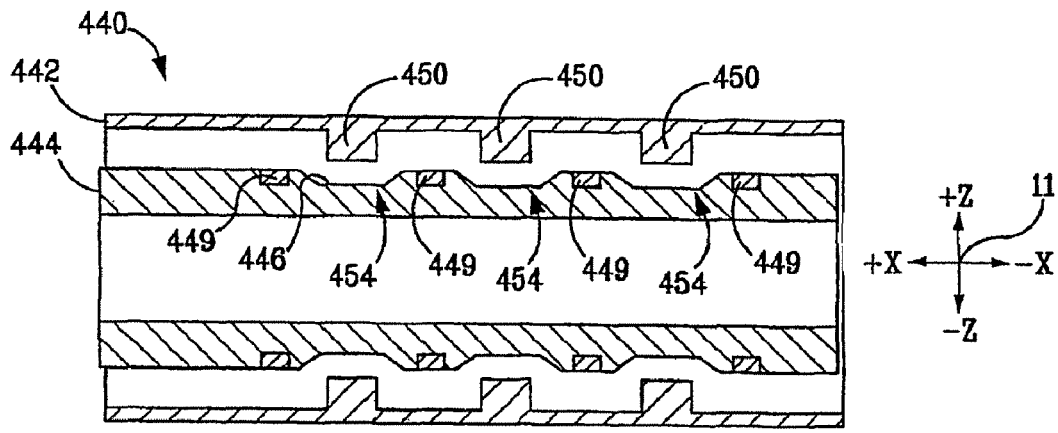
FIG. 17A is a longitudinal cross-sectional view of another alternative embodiment of the valve assembly shown in FIG. 10, depicting a mandrel of the valve assembly in a neutral position.
Figure 17B:
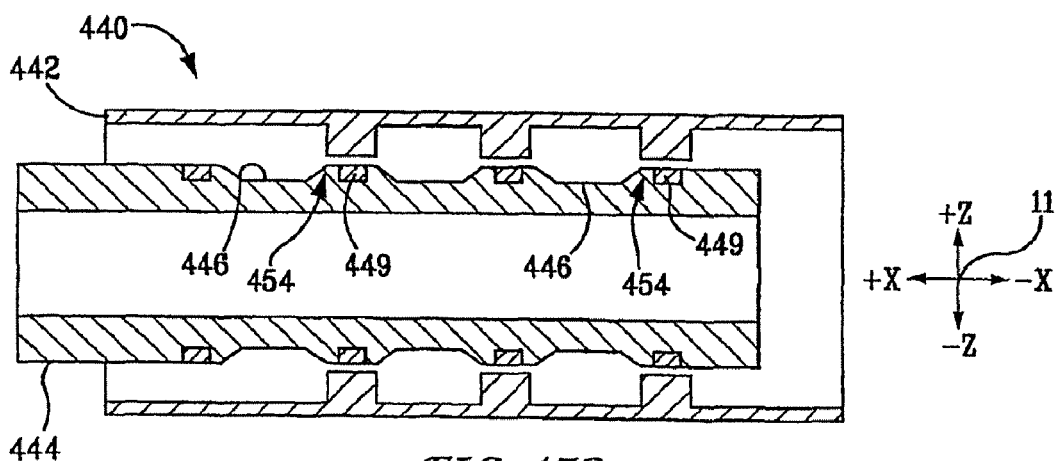
FIG. 17B is a longitudinal cross-sectional view of the valve assembly shown in FIG. 17A, depicting the mandrel in a position removed from its neutral position.

FIGS. 17A and 17B depict another alternative embodiment of the valve assembly 16 in the form of a valve assembly 440. The valve assembly 440 comprises a valve casing 442, and a mandrel 444 positioned within the valve casing 442.

The mandrel 444 has an inner surface 446. A plurality of permanent magnets 449 are embedded in the mandrel 444, proximate the inner surface 446. (The valve assembly 440 does not include coils such as the coils 136 of the valve assembly 14.)

The valve casing 442 includes a plurality inwardly-facing of projections 450. Each projection is separated from the inner surface 446 of the mandrel 444 by a gap 454 filled with MRF. The inner surface 446 is shaped so the gaps 454 are maximal when the mandrel 444 disposed in a neutral (centered) position in relation to the valve casing 442, as depicted in FIG. 17A. The resistance offered by the MRF to relative movement between the valve casing 442 and the coil mandrel 444 is minimal under this condition.

The inner surface 446 of the mandrel 444 is shaped so that axial movement of the mandrel 444 from its neutral position decreases the gaps 454, as shown in FIG. 17B. Moreover, the magnetic fields generated by the permanent magnets 449 become focused in the gaps 454, thereby increasing the flow resistance of the MRF in the gaps 450. Hence, the resistance of the MRF to relative movement between the coil mandrel 444 and the valve casing 442 increases as the coil mandrel 444 moves from its neutral position.

Figure 18:
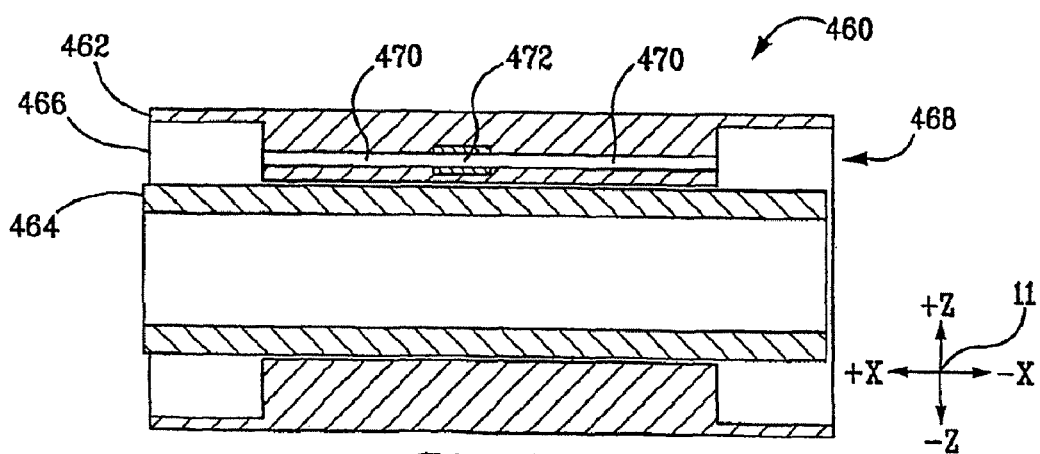
FIG. 18 is a longitudinal cross-sectional view of another alternative embodiment of the valve assembly shown in FIG. 10.

FIG. 18 depicts another alternative embodiment of the valve assembly 16 in the fowl of a valve assembly 460. The valve assembly 460 comprises a valve casing 462, and a mandrel 464 positioned within the valve casing 462.

The valve casing 462 and the mandrel 464 define a first, or up-hole chamber 466 and a second, or down-hole chamber 468. The first and second chambers 464, 466 are filled hydraulic fluid. The first and second chambers 466, 468 are in fluid communication by way of a passage 470 formed in the valve casing 462.

The valve assembly 460 also includes a valve 472 for restricting the flow of hydraulic fluid between the first and second chambers 464, 466 by restricting a flow area of the passage 470. The valve 472 can be controlled by a device such as the controller 146 to increase or decrease the amount of restriction, and thus magnitude of the damping force produced by the valve assembly 460.

PARTS LIST

Vibration damping system 10
Torsional bearing assembly 14
Valve assembly 16
Spring assembly 18
Turbine-alternator module 20
Outer casing 21 (turbine-alternator module 20)
Drill pipe 22
Bearing casing 50
Bearing mandrel 52
Radial bearing 54
Ball bearings 55
Centralizer feed-thru 56
Locking pin 57
Connector 58
Connector 59
Panel 60
Passage 61
Passage 63
Inner surface 64 (of bearing mandrel 52)
Grooves 70 (in bearing mandrel 52)
Outer surface 72 (of bearing mandrel 64)
Grooves 74 (in bearing casing 50)
Inner surface 76 (of bearing casing 50)
Passages 78
Longitudinal centerline 80 (of grooves 70)
Longitudinal centerline 82 (of bearing mandrel 52)
LVDT 84
Magnetic elements 86
Sensor 88
Compensation piston 90
Up-hole side 90' (of compensation piston 90)
Down-hole side 90" (of compensation piston 90)
Reciprocating seals 91
Grooves 92 formed compensation piston 90)
Heal 93 (of seals 91)
Lip 94
Extension 95
Groove 96 (in seals 91)
Spring 97
Valve casing 102 (of valve assembly 16)
Outer casing 103 (of valve casing 102)
Housing 104
Coil mandrel 106
First portion 108 (of housing 104)
Second portion 110
Third portion 112
Radial bearing 120
Sleeve 122
Inner surface 124 (of coil mandrel 106)
First linear bearing 125
Second linear bearing 126

Passage 127
Recesses 128
Outer surface portions 130
Inner surface 132 (of second portion 110 of housing 104)
Gap 135 (between inner surface 132 of second portion 110, and outer surface portions 130 of coil mandrel 106)
Coils 136
Grooves 140 (in outer surface portions 130)
Wireway 142
Electrical feed thru 144
Controller 146
Alternator 147 (of turbine-alternator assembly)
Magnetic fields (produced by coils 136)
First (up-hole) chamber 150
Second (down-hole) chamber 152
Computing device 160 (of controller 146)
Memory storage device 162
Solid state relays 162
Computer-executable instructions 164
Spring casing 200 (of spring assembly 18)
Spring mandrel 202
Spring stack 205
First spring 206
Second spring 208
Inner surface 209 (of spring mandrel 202)
Passage 210
Coupling 211
First spacer 212
Second spacer 214
Lip 216 (of spring casing 200)
Third spacer 218
Compensation module 300
Casing 302 (of compensation module 300)
Mandrel 304
Radial bearing 305
Sliding compensation piston 306
Passage 314 (in mandrel 304)
Inner surface 315
Chamber 316
Valve assembly 400
Valve casing 402,
Inner surface 406 (of valve casing 402)
Coil mandrel 408
Outer surfaces 410 (of coil mandrel 408)
Gap 412
Valve assembly 440
Valve casing 442
Coil mandrel 444
Inner surface 446 (of coil mandrel 444)
Magnets 449
Projections 450 (on valve casing 442)
Gap 454 (between inner surface 446 and projections 450)
Valve assembly 460
Valve casing 462
Mandrel 464
Casing 462
First chamber 466
Second chamber 468
Passage 470 (between first and second chambers 466, 468)
Valve 472

What is claimed is:

1. A vibration damping system for use in a drill string having a drill bit for drilling a bore hole in an earthen formation, comprising:

a first member and a second member, said second member concentrically arranged with respect to said first member and coupled to the first member so that the first member can move axially in an up-hole and a down-hole direction in relation to the second member along an axis of said first and second members and so that torque can be transferred between the first and the second members, one of said first and second members adapted to be coupled to a source of torque for rotating said drill string and the other of said first and second members adapted to be coupled to said drill bit, at least one helical groove formed in at least one of said first and second members for coupling said first and second members to each other so that relative rotation between said first and second members results in relative axial motion between said first and second members in the up-hole or down-hole direction along the axis of said first and second members; and a spring assembly comprising (i) third and fourth members, the fourth member concentrically arranged with respect to said third member, said third member coupled to the first member so that the third member of the spring assembly moves axially in the up-hole and down-hole directions with the first member; said fourth member coupled to the second member so that the fourth member of the spring assembly moves axially in the up-hole and down-hole directions with the second member; and (ii) a spring element for resisting relative movement between the third and fourth members of the spring assembly, wherein said relative rotation between said first and second members that results in axial motion between said first and second members in at least one of said up-hole and down-hole directions is resisted by said spring element.

2. The system of claim 1, wherein said spring element comprises a plurality of Belleville springs.

3. The system of claim 1, wherein said relative rotation between said first and second members that results in axial motion between said first and second members in both said up-hole and down-hole directions is resisted by said spring element.

4. The system of claim 1, wherein said at least one helical groove formed in one of said first and second members is a first helical groove, and wherein the other of said first and second members further comprises a second helical groove, said first and second helical groove forming a helical passage therebetween.

5. The system of claim 4, further comprising at least one ball bearing disposed in said helical passage.

6. The system of claim 1, further comprising a valve assembly for damping vibration, said valve assembly comprising fifth and sixth members, said fifth member coupling said first member to said third member so that said fifth member translates in the up-hole and down-hole directions with the first and third member, said sixth member coupling said second member to said fourth member so that said sixth member translates in the up-hole and down-hole directions with the second and fourth members, the fifth and sixth members of the valve assembly defining a first and a second chamber for holding a supply of a fluid so that the fluid flows between the first and the second chambers in response to relative axial between the first and second members.

7. The system of claim 6, wherein said valve assembly further comprises means for varying the flow resistance of said fluid.

8. A vibration damping system for use in a drill string having a drill bit for drilling a bore hole in an earthen formation, comprising:

a first member and a second member, said second member concentrically arranged with respect to said first member and coupled to the first member so that the first member can move axially in an up-hole and a down-hole direction in relation to the second member along an axis of said first and second members and so that torque can be transferred between the first and the second members, one of said first and second members adapted to be coupled to a source of torque for rotating said drill string and the other of said first and second members adapted to be coupled to said drill bit, at least one helical groove formed in at least one of said first and second members for coupling said first and second members to each other so that relative rotation between said first and second members results in relative axial motion between said first and second members in the up-hole or down-hole direction along the axis of said first and second members; and a spring assembly comprising a plurality of Belleville springs for resisting relative motion between the first and second members in the axial direction, wherein said relative rotation between said first and second members that results in axial motion between said first and second members in at least one of said up-hole and down-hole directions is resisted by said plurality of Belleville springs.

9. The system of claim 8, wherein said relative rotation between said first and second members that results in axial motion between said first and second members in both said up-hole and down-hole directions is resisted by said plurality of Belleville springs.

10. The system of claim 8, wherein said plurality of Belleville springs comprises at least first and second Belleville springs, said first Belleville spring having a higher spring rate than said second Belleville spring, wherein said first Belleville spring is stiffer than said second Belleville spring.

* * * * *